United States Patent [19]

Carmon

[11] Patent Number: 5,640,563
[45] Date of Patent: Jun. 17, 1997

[54] MULTI-MEDIA COMPUTER OPERATING SYSTEM AND METHOD

[75] Inventor: Donald E. Carmon, Chapel Hill, N.C.

[73] Assignee: International Business Machines Corporation, Armonk, N.Y.

[21] Appl. No.: 829,201

[22] Filed: Jan. 31, 1992

[51] Int. Cl.$^6$ .................................................. G06F 9/00
[52] U.S. Cl. .................. 395/672; 364/229; 364/229.2; 364/230.1; 364/230.3
[58] Field of Search ...................... 364/DIG. 1, DIG. 2; 395/650, 672

[56] References Cited

U.S. PATENT DOCUMENTS

| | | | |
|---|---|---|---|
| 3,648,253 | 3/1972 | Mullery et al. | 340/172.5 |
| 5,012,409 | 4/1991 | Fletcher et al. | 364/200 |
| 5,202,987 | 4/1993 | Bayer et al. | 395/650 |
| 5,293,620 | 3/1994 | Barabash et al. | 395/650 |

OTHER PUBLICATIONS

"Some Results of the Earliest Deadline Scheduling Algorithm" Houssine Chetto and Maryline Chetto, IEEE Transaction on software engineering, vol. 15, Nov. 10, Oct. 1989.
"Dynamic scheduling of Hard Real–Time task and Threads", Karsten Schwan et al., Proceeding of the second IEEE symposium on parallel and Distributed processing 1990, Univ. of Texas at Dallas, Dec. 9–13, 1990.
V. Gafni, "A Model for a Hard Real Time System Executive", pp. 69–74, IFAC Conference on Real Time Programming, Valencia Spain, copyright 1988.
Henn, "Feasible Processor Allocation in a Hard–Real–Time Environment", The Journal of Real–Time Systems, vol. 1, pp. 77–93, copyright 1989 Kluwer Academic Publishers.
Xu and Parnas, "Scheduling Processes with Release Times, Deadlines, Precedence and Exclusion Relations", IEEE Transactions on Software Engineering, vol. 16, No. 3, Mar. 1990, pp. 360–369.

Chetto and Chetto, "A Feasibility Test for Scheduling Tasks in a Distributed Hard Real–Time System", APII vol. 24, 1990, pp. 239–252, copyright AFCET 1990.

12th Real–Time Systems Symposium. 4 Dec. 1991, San Antonio, TX pp.116–128 'XP000337216 Harbour Et Al.' "Fixed Priority Scheduling Of Periodic Tasks with Varying Execution Priority" p. 117, left col. Lines 23, 42 p. 118, right column, line 12–p. 119, left col. line 31.

Informatik Spektrum, vol. 14, No. 3, Jun. 1991, Berlin De, pp. 123–136 'XP000209516 Herrtwich' "Betriebsmittelvergabe unter Echtzeitgesichtspunkten" Whole document.

Primary Examiner—Kevin A. Kriess
Assistant Examiner—Majid A. Banankhah
Attorney, Agent, or Firm—John J. Timar

[57] ABSTRACT

An operating system for scheduling execution of a random set of periodically recurring hard, real-time tasks encountered in multi-media computer system applications and which is useful in a multi-tasking computer operating environment. Periodically recurring computer tasks having relatively short execution periods for which execution results are absolutely required in hard, real-time environments such as multi-media systems, create a significant task scheduling overhead reducing the available processor resource. Overhead processing at task invocation is eliminated in the invention by placing all active recurrent tasks in an execution queue, regardless of the task's current state of activity and by reprioritizing the order of execution of the tasks in the queue whenever a given task execution is completed. Measured by reduction in task scheduling overhead consumed by the processor in scheduling the tasks, this achieves a 50–100% improvement over conventional scheduling and operating systems.

10 Claims, 10 Drawing Sheets

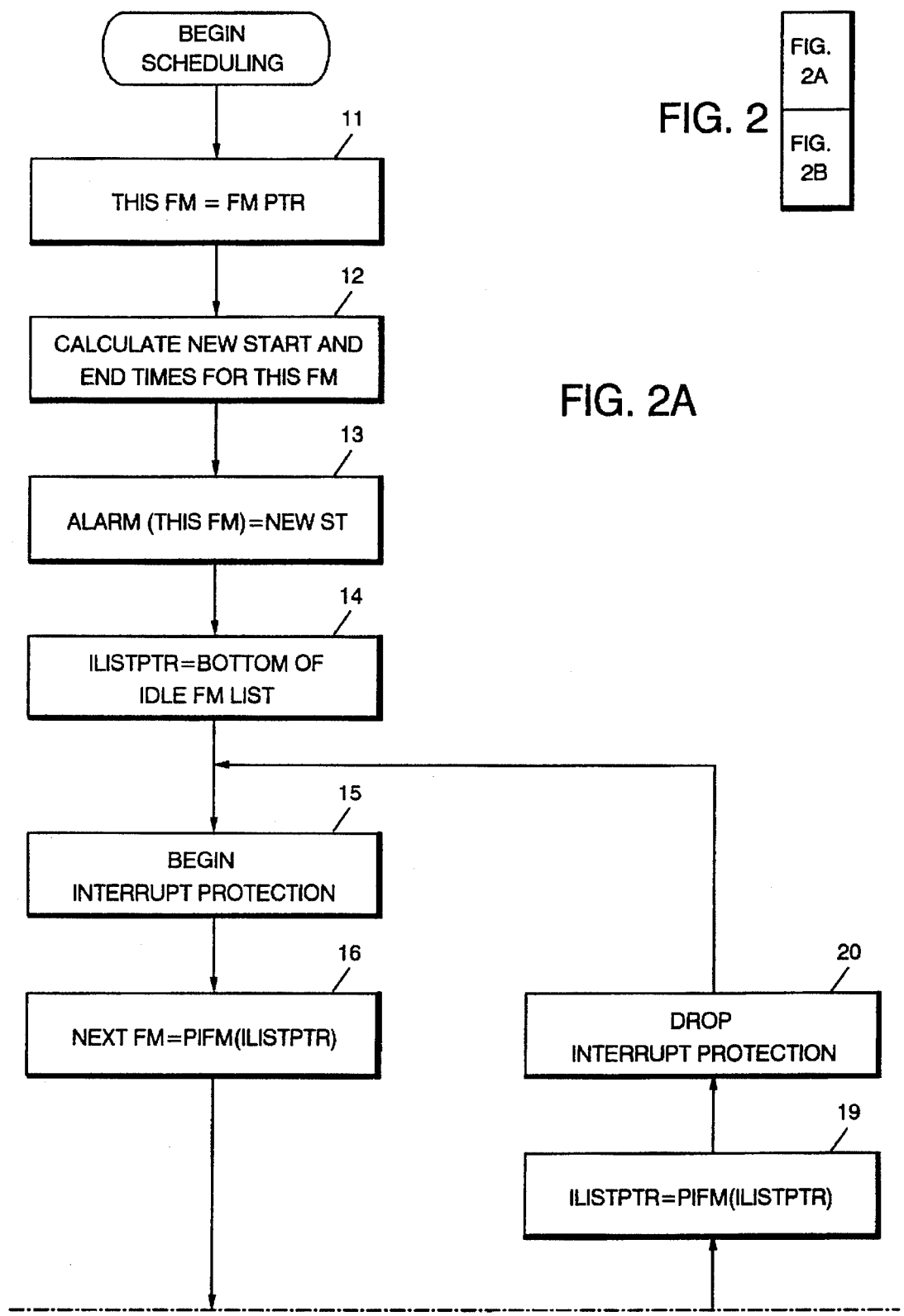

MULTI-MEDIA COMPUTER OPERATING SYSTEM AND METHOD

FIELD OF THE INVENTION

This invention relates to computer operating systems in general and more specifically to those computer operating systems adapted for multi-tasking operation, particularly in the environment of hard, real-time result required environments such as those prevalent in multi-media computer system applications.

PRIOR ART

Hard, real-time task execution scheduling has been the subject of numerous investigations and papers. Among them, the following are generally representative and describe the general problem faced:

V. Gafni, "A Model for a Hard Real Time System Executive", pp. 69–74, IFAC Conference on Real Time Programming, Valencia, Spain, copyright 1988.

Henn, "Feasible Processor Allocation in a Hard-Real-Time Environment", The Journal of Real-Time Systems, Vol. 1, pp. 77–93, copyright 1989, Kluwer Academic Publishers.

Xu and Parnas, "Scheduling Processes with Release Times, Deadlines, Precedence, and Exclusion Relations", IEEE Transactions on Software Engineering, Vol. 16, No. 3, March 1990, pp. 360–369.

Chetto and Chetto, "A Feasibility Test for Scheduling Tasks in a Distributed Hard Real-Time System", APII, Vol. 24, 1990, pp. 239–252, copyright AFCET 1990.

In hard, real-time operating environments, guaranteed results of execution of any task must be made available by a fixed or "hard" deadline or else the application requiring the result of the task will fail and/or, any other tasks awaiting execution may be adversely affected. In order to overcome this problem, scheduling algorithms such as noted in the aforementioned papers are commonly used to perform task execution scheduling whenever a new task is invoked as an active task in a multi-tasking system. This is normally performed by rescheduling the tasks according to their priority whenever a task arrival or start or invocation time occurs by placing the task to be executed in an execution queue or schedule with other tasks currently running or awaiting the opportunity to run. This approach amounts to conducting an order "N" sorting routine, where the worst case number of sorting iterations required depends upon the number of tasks currently in the execution queue.

It is generally well-known and recommended that the scheduling of tasks in hard, real-time computer systems should best be performed by ordering the currently active tasks by their relative completion deadlines with the earliest completion deadline having highest priority. (See Henn, Xu et al or Chetto et all supra.) However, actual systems for implementing such an approach have proved to be much more difficult to build. The possibility of interruption of an executing task and the overhead processor resource consumption in task switching and reordering the execution schedule can grow to prohibitive proportions. As noted by Xu et al, no published solutions existed for the more general problem in which some tasks or portions of tasks may be preemptable and some may not be. The solution proposed by Xu et al uses the "earliest deadline first" strategy, but goes on to include a very complex branch and bound reordering process unsuitable to real-time rescheduling of priorities.

Real-time rescheduling of prioritized tasks in a hard, real-time environment when preemption (interruption) of an executing task is permitted must be handled in an efficient manner or the ability to meet critical execution deadlines is lost due to overhead processing invoked in a scheduling method. One approach is known as the "Reactive Systems Executive" (RSEX) and has been described by Gafni, supra. This model uses the earliest deadline criterion for prioritization on a single processor system but must keep track of elapsed time and update the remaining time for each task awaiting execution (p.72) and must update the list of tasks by adding any newly invoked ones. This changes the priority order and may result in an interrupted task's suspension due to loss of priority to a newly invoked task of higher priority. This, in a dynamically changing task-mix, such as encountered in multi-media applications, would lead to unnecessary processing and, perhaps, actual missing of a completion deadline when a newly invoked task has highest priority but whose execution period will consume so much of the remaining time as to cause another task to not complete on schedule. In other words, an interrupting task with the earliest required completion deadline can get priority to execute and consume so much of the remaining time that another task, such as the one that was running when the interrupt occurred, may not have sufficient time left to complete on schedule once the high priority interrupting task has run to completion.

In a multi-media environment, the hard, real-time tasks tend to occur on a cyclically recurring basis. Furthermore, due to the random mix of applications or tasks that may be required, task arrival times will periodically coincide. Thus, on a regular basis, scheduling for every task active in the system will be performed before any task can begin execution. Due to the periodically recurring nature and concentration of task scheduling activities, a severe impact on the ability of the system to schedule any given set of tasks results. As mentioned above with regard to the prior art, the scheduling activity may result in blocking execution of any current task being executed or of adding to the task's switching time if another task in the queue has a higher priority. The computer processor resource, i.e. number of processor cycles available for actual task execution as opposed to task scheduling, is thereby adversely affected. In a hard, real-time system, each task must have sufficient processor cycle resource remaining available in order to execute and run to completion on each and every one of its recurring execution periods, or failure of the application requiring the task will occur. In addition, the task having the shortest execution iteration or recurrence period becomes a limiting factor for determining whether a given set of tasks can be scheduled at all.

Beginning with an empty schedule queue, a worst-case "scheduling overhead" measured, as a fraction of available processor resource, achieved by a conventional scheduling algorithm which schedules tasks into the priority queue at their arrival or invocation times is given by Equation 1 below:

$$\text{Overhead}_{conv} = \sum_{i=1}^{N} \frac{i \cdot C_{sched}}{T_s} = \frac{(N)(N+1)C_{sched}}{2T_s} \qquad \text{Equation 1}$$

where $C_{sched}$=time to execute one iteration of the scheduling code

N=number of tasks to be scheduled $T_s$=shortest execution period in the set of tasks being scheduled As can be seen from Equation 1, scheduling overhead that is incurred by a random mix of periodically recurring tasks is inversely proportional to the shortest execution period of any task currently active in the system. This is an unfair penalty to tasks which have long execution periods as opposed to those having shorter ones and is a problem solved by the present invention.

OBJECTS OF THE INVENTION

It is an object of the invention to provide an improved operating system for a multi-tasking computer system environment using an improved task scheduling system and method which reduces the task scheduling processor cycle overhead demand.

It is a further object of the invention to provide a multi-media computer system operating method and apparatus ideally suited to the scheduling of a randomly occurring mix of periodically recurring tasks having varying executing periods.

BRIEF SUMMARY OF INVENTION

The invention addresses the foregoing and still other objects that have not been specifically enumerated by creating an execution queue or list containing all of the invoked tasks currently active in the multi-tasking system regardless of the present state (i.e. awaiting a start time or currently being executed). The order of tasks in the queue is established by priority. Priority of tasks is in turn established at task completion times by their relative required execution deadlines. This prioritization, rather than a schedule prioritized merely at arrival time of the task on the basis of task starting times or ending times alone, is a key departure from the prior art. In addition, the order of the schedule of tasks to be executed is examined and rearranged in accordance with the relative priorities of the tasks whenever a task execution is completed or whenever a new task is added to or deleted from the queue of tasks currently active in the multi-tasking system. The reduction in processor cycle overhead incurred by the scheduling process and technique of the invention may be shown to result in a 50–100% improvement (or more) depending upon the exact mix of a randomly occurring selection of tasks having recurring iteration frequencies varying over a wide range. This improvement is critical in multi-media applications where a relatively large number of hard, real-time, result-dependent user applications may be running simultaneously. Other similar needs exist in robotic applications where a plurality of motions and servomechanism feedback signals must be managed, and in a variety of other application environments where a plurality of diverse tasks must be run to provide results in a hard, real-time driven fashion in order to accomplish the objectives of the user's application.

BRIEF DESCRIPTION OF DRAWINGS

The invention will be further illustrated and described in detail with respect to a preferred embodiment thereof as depicted in the drawings in which:

FIG. 4 comprises FIGS. 4A and 4B as shown by the arrangement schematic of FIG. 4.

DETAILED DESCRIPTION OF PREFERRED EMBODIMENT OF INVENTION

Figure 1:
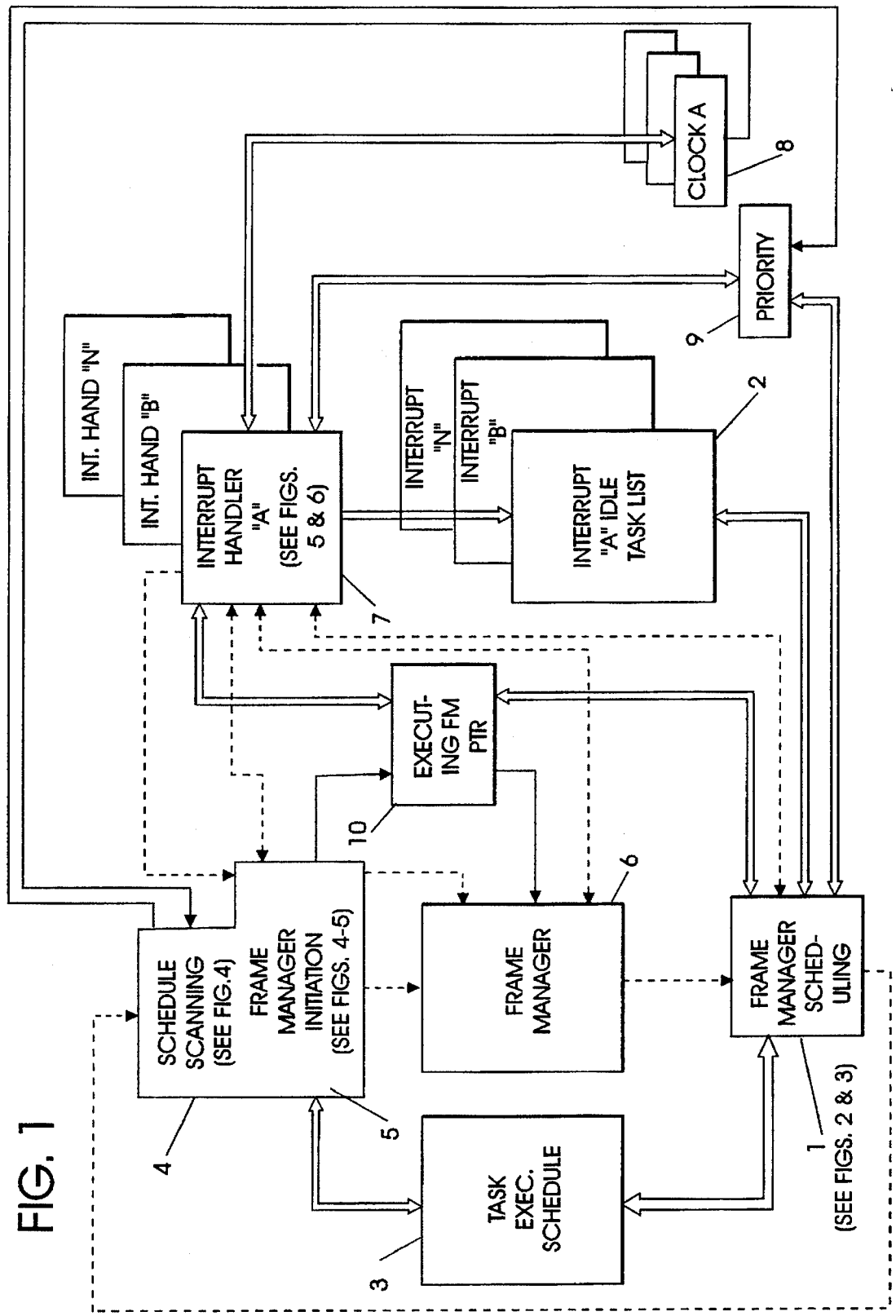
FIG. 1 schematically represents the arrangement of elements in the computer operating system as functional blocks of controlling code and data together with the data and control flow interrelationships present in the computer system of the invention.

At the outset, the preferred embodiment of the invention herein will be described in the context of a multi-media application computer system. Such a system normally comprises a host computer, such as a Personal Computer, running a variety of user applications of the "multi-media" type, a digital signal processor for performing the specific multi-media application support tasks and data and control interchange means such as DMA access and control interconnecting the digital signal processor with the host processor. Such a system is shown and described in detail in my copending patent application serial number 07/761534, commonly assigned herewith. An example of a signal processor in which the present invention may find use as an operating system may be seen in U.S. Pat. No. 4,794,517, also commonly assigned herewith.

Briefly, the operating system of the present invention is utilized in a digital signal processor such as that shown in U.S. Pat. No. 4,794,517 which illustrates a pipelined signal processor having a true Harvard architecture with separate instruction and data memories and associated buses, an arithmatic and logical unit (ALU), a multiplier/accumulator, and other elements suited to the rapid accomplishment of iterative signal sample processing algorithms prevalent in applications such as those found in multi-media environments. The aforementioned patent is incorporated herein by reference as a teaching of a suitable signal processor architecture and structure in which the present operating system may be installed for use. It should be readily apparent that the present invention is not limited, however, to the digital signal processor field but may find equally useful applicability in large mainframe systems or intermediate systems wherever multi-tasking and/or multiple, dynamically variable mixes of iterative, recurrent hard, real-time algorithmic tasks must be performed.

As described briefly above, typical scheduling methods used in real-time operating systems perform task execution scheduling at the time a task arrives or is invoked to start. In such systems, when a task start or arrival time occurs, the task is placed in an execution queue according to its priority in comparison with other tasks currently running or awaiting their turn to run in the system. This requires execution of an N-order sorting routine with a number of iterations dependent upon the number of tasks currently in the queue. Due to the cyclic or recurrent nature of task invocations in a multi-media environment in particular, the task arrival or invocation times of any arbitrary set of tasks can and will periodically coincide with one another. Therefore, on a regularly recurring basis, the scheduling for every task resident in the system must be performed before any task can begin execution. This periodic and repetitive concentration of scheduling activity may severely impact the processing system's ability to schedule a given set of tasks or to execute them. In hard, real-time systems, each task must be assured sufficient processor cycle resource to execute to completion before the end of each and every one of its execution periods as they recur. The task having the shortest execution period becomes a limiting factor for determining whether a given set of tasks can be effectively scheduled at all.

For the conventional process of scheduling as described, the scheduling of tasks at their arrival or invocation times is the source of a processor "overhead" or demand on the processor resource necessary to accomplish the scheduling. This is shown by Equation 1 above.

In the present invention, the scheduling process performs task rescheduling at the task's execution end or completion time, as opposed to the task arrival or start times. Task completion times can never coincide, as task arrival or start times could, because only one task can actually be executing in the processor at any given instant of time. The problem of periodic concentration of scheduling overhead is therefore eliminated by the present invention. Importantly, the scheduling of any given task need not be completed before some other task execution may be initiated. For example, if an arrival or start time of a higher priority task occurs while a lower priority task is being scheduled in the present invention, the scheduling of the lower priority task, task B, may be temporarily suspended while higher priority task A is actually invoked and run to completion. Following completion of task A, the task A is rescheduled at its regularly recurring or periodic iteration interval and the scheduling of task B is resumed and perhaps task B, if it is the highest priority task resident and ready to be run, will be completed.

In the present invention, by scheduling tasks at task execution completion time as opposed to task initiation or arrival times, the typified task execution queue is replaced with another queue or list containing all of the tasks at all times regardless of their current state of activity. In the present preferred embodiment, this list is referred to as the "schedule". The schedule contains an ordered, prioritized list corresponding to all of the tasks which have been invoked for execution, regardless of their execution state, i.e. being executed or awaiting execution. The list is dynamically reordered and adjusted as tasks run to completion and are rescheduled for their next regularly recurring execution time or as tasks are added to or deleted from the system.

In programming terms, the schedule is a doubly linked list in which one entry has a pointer to the next entry address where the next priority order entry exists and the second entry has pointers back to the first entry and forward to the next entry in priority, etc. The entries in the schedule in the present invention are not the tasks themselves, but are "place holders" for invoking various fixed-frequency, recurrent task handling code for all tasks in the system which may share the same recurrent task iteration period or frequency. In the present invention, these place holders are termed "frame managers". The frame managers are the entries in the doubly linked list in the schedule or queue corresponding to the ordered priority list related to the tasks to be executed.

Frame managers are ordered in the queue or schedule by the end times, i.e. the task completion deadlines, at the iteration interval at which the frame manager is invoked. The earliest task completion deadline or end time is the first priority entry and other frame managers are linked in a prioritized order based on their end times with the second earliest end time being the second entry, etc. Whenever two or more frame managers have equal ending times, as can result where the recurrent periods form multiples of one another, etc., the frame managers having equal task deadline completion times may be further ordered in the doubly linked list or prioritized therein by their starting times, with the earliest starting time task frame manager being first. In the doubly linked list, the first frame manager entry in the schedule is chosen to be a dummy frame manager called the "top of schedule" which is a place holder for containing the pointer to the first address in memory where the present highest priority frame manager resides. The last frame manager entry in the doubly linked list is always assigned to a non-real-time frame manager that is utilized for calling any non-real-time task, such as housekeeping tasks, that may be resident in the system and which are executed only after all of the hard, real-time tasks have been completed.

In the present embodiment, there is also an idle frame manager list or idle task queue. It contains the ordered list of all idle frame managers, i.e. those frame managers that have completed their execution for the current time and are awaiting their next recurring start times. The idle list entries are further arranged corresponding to various levels of interrupt sources, there being a separate list for each level of interrupt source. The frame manager idle lists are also doubly linked lists containing frame manager indicators awaiting the occurrence of their next starting or invocation time for execution. The interrupt handlers in the present invention are separate and keep track of the frame managers in the idle list corresponding to the level of interrupt on which a given task or frame manager resides. Frame managers in the idle list are ordered or prioritized by their start times rather than the task completion or end times, with the earliest start time being first. When two or more frame managers happen to have equal starting times, only the frame manager with the earliest end time is kept in the idle frame manager list.

A further, much more detailed description of the task execution queue of frame managers, of the queue or list of idle frame managers and of the various portions of control code and control data utilized will be described with reference to FIG. 1. However, in order to understand the advantage achieved by the present operating system invention in prioritizing the queue of tasks for execution in accordance with the task completion deadlines, a further explanation follows.

Scheduling overhead load on the available processor resource for the present invention is described by Equation 2 below.

$$\text{Overhead}_{ISPOS} = \sum_{i=1}^{N} \frac{N \cdot C_{sched}}{T_i} \qquad \text{Equation 2}$$

where $C_{sched}$ = time to execute one iteration of the scheduling code

N = number of tasks to be scheduled $T_i$ = execution period of task i

In the present invention, the scheduling of all tasks in an execution queue, regardless of the present state of the activity of the task, incurs at least a slight penalty. It may be noted that the N in the numerator of Equation 2 indicates that, in the worst case, each task will have to be sorted against all other tasks in the system. The advantage, however, is that $T_s$ is no longer the common denominator as it was in Equation 1. For purposes of comparing the overhead loads of the two scheduling processes, Equation 1 may be reexpressed in the frequency domain as Equation 3:

$$\text{Overhead}_{conv} = \sum_{i=1}^{N} i \cdot C_{sched} F_{max} = \frac{(N)(N+1) C_{sched} F_{max}}{2} \quad \text{Equation 3}$$

where $$F_{max} = \frac{1}{T_s} =$$

scheduling frequency of task with shortest execution period

Furthermore, Equation 2 may be expressed in the frequency domain as shown by Equation 4A below:

$$\text{Overhead}_{ISPOS} = \sum_{i=1}^{N} N \cdot C_{sched} F_i = N \cdot C_{sched} \sum_{i=1}^{N} F_i \quad \text{Equation 4A}$$

where $$F_i = \frac{1}{T_s} = \text{scheduling frequency of task } i$$

The average of the scheduling frequencies in the frequency domain for a given task set is given by Equation 4B below:

$$F_{avg} = \frac{1}{N} \sum_{i=1}^{N} F_i \quad \text{Equation 4B}$$

Equation 4B may be rewritten in terms of the average of the task scheduling frequencies as shown in Equation 5 below:
Equation 5

$$\text{Overhead}_{ISPOS} = N \bullet N \bullet C_{sched} F_{avg}$$

where $F_{avg}$ = the average of the task's scheduling frequencies

Finally, the comparison my be simplified by assuming that $C_{sched}$ which is the time to execute one iteration of the scheduling process in the operating system, is roughly equivalent for any scheduling algorithm given an equal number of tasks. This is a reasonable assumption because all algorithms require essentially some type of sorting loop for placing tasks in an execution queue. Given this assumption, the efficiency of the present operating system scheduling technique is as compared with the conventional scheduling technique as shown by Equation 6 below:

$$EFF_{ISPOS} = \frac{\frac{(N)(N+1) C_{sched} F_{max}}{2}}{N \cdot N \cdot C_{sched} F_{avg}} \quad \text{Equation 6}$$

Equation 6 may be simplified as shown in Equation 7 below:

$$EFF_{ISPOS} = \frac{(N+1)}{2N} \frac{F_{max}}{F_{avg}} \quad \text{Equation 7}$$

Equation 7 clearly shows both the penalty and the advantage of the present scheduling technique in the operating system of the invention. The N+½N factor is the penalty. Its contribution to the overall efficiency ranges from 1 for N=1 on down to ½ when N=infinity. The ratio of maximum frequency to average frequency gives a measure of the scheduling advantage of the present technique since this factor will always be greater than 1, except when the maximum equals the average frequency, when it will be equal to 1, exactly. In short, whenever the maximum frequency of recurrence is greater than or equal to about twice the average frequency of task recurrence, the present scheduling process is far more efficient than the conventional scheduling algorithm.

In a multi-media application system, the probability that the maximum recurrent task frequency will be significantly greater than the average recurrent task frequency is quite high. In a multi-tasking operating system such as the present invention which deals with tasks running under several different data sampling rates, each having unique requirements, it is likely that the optimum scheduling frequencies for each task may differ significantly. For example, a typical communication modem task requires four different scheduling frequencies for the subtasks involved in it. Namely, one type of task must be executed at a frequency of 16.216 Hz, another at 204.255 Hz, another at 600 Hz and yet another at 1378.125 Hz. For such a modem application, N=4, the maximum frequency equals 1378.125 Hz, the average frequency equals 549.649 Hz and the efficiency of the scheduling process is equal to 1.567 as calculated from Equation 7.

Telephone answering including DTMF tone decoding, frequency synthesis applications or tasks for voice response, etc. requires six different subtasks running at different recurring frequencies in which N=6, $F_{max}$=1378.125 Hz, $F_{avg}$=534.783 Hz and the efficiency calculated from Equation 7 is 1.503. Although neither of the examples given has an extremely wide divergence between the maximum frequency and average scheduling frequency of tasks, the scheduling improvement is still above 50% in terms of reduction of processing overhead. Even greater improvements of well over 100% may be experienced in an appropriate mix of frequencies and tasks. For example, a task set having hypothetical scheduling frequencies for four tasks of 15 Hz, 40 Hz, 100 hz and 1378.125 Hz results in N=4, $F_{max}$=1378.125 Hz, $F_{avg}$=383.281 Hz and the efficiency is 2.247. This represents a more than 124% improvement in the efficiency of the scheduling process and consequent reduction in the processor resource overhead involved in the scheduling of tasks in the system. Another advantage of the present invention is that the scheduling technique reduces task blocking and task switching times since the scheduling process is not performed at the arrival times and does not become a part of the task blocking or switching latency.

Returning now to a more detailed description of the preferred embodiment, it may be noted that the tasks themselves are not directly scheduled and rescheduled. Instead, place holders which are called "frame managers" and which correspond to identifiers for invoking a common task handling code routine are inserted in the queue. The frame manager is, in fact, a special task itself and executes a group of common, periodically recurring tasks at a frequency of recurrence that matches that of any tasks associated with the frame manager. A frame manager executes all tasks having the same task completion deadline which may be assigned to it and returns to the operating system for rescheduling in the queue when it has completed all of its assigned tasks.

The operating system supplies the frame manager code shared by all frame managers in the system. Each frame manager needs its own data structure called a frame control block (FCB) to be initialized before the frame manager can be activated by the operating system. The frame control block regulates the execution of the frame managers. Tasks having a common execution period are grouped together and linked as associated to a common frame manager that is their place holder in the execution queue. There is thus one frame control block for each frame manager resident in the system queue at any given time. For the examples given above in which four or six different scheduling frequencies might be encountered, there would be four or six different frame managers with their frame control blocks.

The frame control blocks are constructed by the host system and passed to the digital signal processor for storage as control data. The frame control block is a data structure that contains all of the information that the operating system of the present invention needs in order for it to schedule the frame manager into the execution queue or list. It also contains designation of the area or address in memory where the processor registers in the digital processor may be saved when task switching is executed. The FCB also contains the address designations for digital signal processor storage area or memory for any processing tasks to be associated with the frame manager and the identifying starting address for the beginning of the frame manager's linked list of subtasks having equal task completion deadline periods or times. A typical frame control block must be initialized as shown in Table 1, below, before the frame manager is activated.

TABLE 1

The Frame Control Block

| Name | Offset | Required Initial Value |
|---|---|---|
| PIFM | '0000'x | 0 |
| NIFM | '0002'x | 0 |
| ALARM | '0004'x | 0 |
| INTLINK | '0006'x | Pointer to interrupt handler's data structure |
| PSFM | '0008'x | 0 |
| NSFM | '000A'x | 0 |
| ETH | '000C'x | 0 |
| ST | '000E'x | 0 |
| INTFLG | '0010'x | 0 |
| FRAME | '0012'x | Frame size |
| FRAMEH | '0014'x | Upper 16 bits of frame time |
| OSRTN | '0016'x | The instruction address labeled SCHEDLER |
| FIRSTTCB | '0018'x | 0 |
| ISADDR | '001A'x | The instruction address labeled FM |
| SILR | '001C'x | 0 |
| SR0 | '001E'x | 0 |
| SR1 | '0020'x | 0 |
| SR2 | '0022'x | 0 |
| SR3 | '0024'x | 0 |
| SR4 | '0026'x | 0 |
| SR5 | '0028'x | 0 |
| SR6 | '002A'x | 0 |
| SR7 | '002C'x | 0 |
| SR2L | '002E'x | 0 |
| SR6L | '0030'x | 0 |
| SRMH | '0032'x | 0 |
| SRML | '0034'x | 0 |
| SMCRH | '0036'x | 0 |
| SPSRH | '0038'x | 0 |
| SRCDB | '003A'x | 0 |
| PRESENTH | '003C'x | 0 |
| SCYCLCNT | '003E'x | 0 |
| SDSPTR | '0040'x | 0 |
| SYSTMP0 | '0042'x | 0 |
| SYSTMP1 | '0044'x | 0 |
| SYSTMP2 | '0046'x | 0 |
| SYSTMP3 | '0048'x | 0 |
| SYSTMP4 | '004A'x | 0 |

The construction of an FCB is carried on by the host processor in conjunction with the DSP and is not specifically a part of this invention. Therefore only this resulting structure and content of the frame control block is shown in the table. In Table 1, the first two entries are the pointers to the beginning and ending of the idle frame manager list which is held in association with each interrupt level as control data. A third entry is an alarm or start time indicator and the fourth entry is the interrupt linking address pointer to the interrupt handler data structure associated with the given FCB. The fifth and sixth entries are the pointers to the beginning and end addresses of the schedule or task execution priority queue of frame managers. The 15th through 38th entries are the addresses in memory where context of the digital signal processor's current operating conditions may be saved whenever preemption of the frame manager occurs.

Data that must be initialized by the host prior to activating a given frame manager is set into the frame control block by the host and passed to the digital signal processor.

By name in Table 1, the following is a more detailed description of the data that must be initialized prior to activation of a given frame manager in the digital signal processor.

INTLINK—this entry contains a pointer (i.e. an address in memory, where there resides an appropriate interrupt handler data structure associated with a specific type of user hardware (i.e. a modem, a compact disc player for audio, a video display, etc.) with which a given frame manager is to be associated.

FRAME—holds the frame size as a number of digital sample times. This is the time covered by the task periodicity or recurrent task interval. The time frame is measured in "sample times" in which digital samples are presented to the digital signal processor by the associated user hardware. For example, a task having a frame size of N will be executed once every N sample times of the given sampling frequency of the user hardware.

FRAMEH—is a 16 bit number representing the frame manager's actual frame time where the 16 bits are the upper 16 bits of a number calculated by the number of interrupts per frame time multiplied by the interrupt source's interrupt period.

ISADDR—This entry holds a pointer to the frame manager's instruction code in the digital signal processor memory.

OSRTN—This entry holds the return address for the frame manager instruction code.

FIRSTTCB—This entry is an address of the beginning of the frame manager's linked list of tasks to be executed by that frame manager on or before the occurrence of its specific deadline at its recurrent frequency. This location is normally used to indicate a task control block (TCB) of the first task assigned to the frame manager. However, in order to allow a frame manager to be activated without any tasks being linked to it, this entry may be initialized to 0. Whenever this entry holds a 0, the frame manager will simply return to be rescheduled. Other data locations in the FCB are used to accommodate scheduling and task switching and are briefly described as follows.

PIFM is the previous idle frame manager. This is a backward pointer to the previous frame manager in the idle frame manager list.

NIFM—The next idle frame manager. This is a forward pointer to the next frame manager in the idle frame manager list.

Alarm—holds the frame manager starting time measured relative to a sample clock maintained by the frame manager's interrupt handling code. The interrupt handling code uses the alarm contents and SCLOCK to determine when a frame manager start time has arrived.

PSFM—the previous scheduled frame manager. This is a backward pointer to the previous frame manager in the frame manager execution queue or schedule.

NSFM—the next scheduled frame manager is a forward pointer to the next frame manager in the prioritized frame manager execution queue or schedule.

ETH—end time high. This entry holds the upper 16 bits of the frame manager's current ending time.

ST—this is the start time. It holds the frame manager's current assigned starting time. Starting times are measured relative to the sample clock kept by the frame manager's interrupt handler code and is used to determine if a frame manager has reached a ready-to-run condition.

INTFLG—interrupt flag. This is used to indicate whether the frame manager is interrupted or is executing or if it is in an idle or waiting state waiting for a start time. Whenever a frame manager reaches the beginning of its execution time and the interrupt flag is equal to 0, the frame manager is idle and execution will begin at the first entry in the frame manager's code. If the interrupt flag bit is equal to 1, the frame manager was interrupted previously and the machine context must be restored and execution resumed from where the interrupt occurred.

The entries SLLR through SRCBD are locations used to save the machine status and context whenever a frame manager is interrupted during execution or preempted by a higher priority frame manager beginning execution.

PRESENTH—the present high contains the present upper 16 bits of the current task's remaining allocated cycle count.

SCYCLCNT—save cycle count. This is used to save the contents of a cycle count register when a frame manager is interrupted and/or preempted by a higher priority frame manager. The cycle count register contains the lower 16 bits of the current task's remaining execution cycle count.

SDSPTR—system data store pointer is used to save the data storage area address pointer when a frame manager is preempted and holds the pointer to the currently executing task.

SYSTMP0 through SYSTMP4 are data locations reserved for tasks to use as a temporary absolute data storage area. Data placed in these locations will only be valid during the task's current execution. A task cannot assume that data placed in these locations will be valid from one execution period to the next.

The interrupt handler data structure is described briefly next. Table 2 shows the interrupt handler data structure which contains software clocks, the beginning and end of idle frame manager list entries and all of the interrupt specific data needed for scheduling.

TABLE 2

The Interrupt Handler Data Structure

| Name | Offset | Description |
| --- | --- | --- |
| LIFM | '0000'x | Pointer to last idle frame manager |
| FIFM | '0002'x | Pointer to first idle frame manager |
| CLOCKH | '0004'x | Upper 16 bits of the real time hardware clock |
| SCLOCK | '0006'x | Sample clock |
| IPERIODH | '0008'x | Upper 16 bits of the interrupt period |
| IPERIODL | '000A'x | Lower 16 bits of the interrupt period |
| INTFREQ | '000C'x | Interrupt frequency |
| SPERINT | '000E'x | Number of sample times per interrupt period |

The data contained in the interrupt handler structure is initialized by the host processor as well. It is not a specific part of this invention but is described here for understanding of the operation of the operating system which is the present invention.

LIFM—the last idle frame manager. This is a pointer or address of the end of the doubly linked list of idle frame managers. This points to itself when the list is empty.

FIFM—first idle frame manager. This is a pointer to the beginning address of the doubly linked list of idle frame managers. FIFM points to LIFM when the list is empty.

CLOCKH—clock high. This holds the real time of the latest interrupt and is updated from a time stamp register which captures the current time whenever a block of samples is received for processing by the digital signal processor in association with a given task.

SCLOCK—the sample clock. This holds relative sample times measured as a number of sample times in the hardware system for the user task being executed during each interrupt period. At each interrupt time, the interrupt handling code increments SCLOCK by an amount held in another register SPERINT which is the samples per interrupt and measures the number of samples in sample times of the user hardware device that will be generated and used for each interrupt period.

IPERIODH—the interrupt period high holds the upper 16 bits of a number proportional to the actual interrupt frequency of the user hardware device.

IPERIODL—the interrupt period low holds the lower 16 bits of a number proportional to the actual interrupt frequency of the user hardware device.

INTFREQ—the interrupt frequency holds a number proportional to the actual interrupt frequency in Hz.

General Overview of Operation

The scheduling and ordering of execution of the frame managers in the schedule list is determined by the interrelationships of the starting and ending times associated with each frame manager. In general, frame managers having the earliest ending deadlines or end times will be executed first. However, since a frame manager may only be permitted to execute after reaching its start time, frame managers having later end times but earlier start times may execute while a given frame manager with an earlier end time is awaiting the beginning of its start time. As soon as the earlier frame manager start time arrives, the later end time frame manager will be preempted and its status must be saved. The operating system of the present invention manages the interrelationship between frame manager starting and ending times and determines which frame manager should be executing through the use of the schedule, the ordered prioritized list of all frame managers present in the system at a given time. It also utilizes the multiple idle frame manager list (simply the ordered lists of idle frame managers) associated to each interrupt level. This contains the identifies of frame managers that have completed execution during their current frame iteration times that are awaiting their next iteration start time. A priority register area in data memory is utilized to hold a copy of the end time of the frame manager which is currently being executed.

In brief, a user at a host computer may invoke a number of user multi-media tasks, for example. The tasks might be to run a modem, play back audio from a CD disc player, operate a video display from compacted video data, etc. The user invoking these tasks will enter them as requests to the host system which will create the frame control blocks and pass them to the digital signal processor where they reside in memory. The host will also load into the digital signal processor memory, if required, the specific task execution routines to support the user's invoked applications. The host will also build task control blocks to be passed to the digital signal processor where they reside in memory for locating and fetching the specific task execution code. Once the host processor has requested initialization and scheduling of a frame control block, the digital signal processor operating system takes control and begins operation as shown in the overall flow and schematic of FIG. 1.

Referring to FIG. 1, the operating system first accesses the frame manager scheduling code contained in the control code block 1 in memory. The processes are described in detail with relation to FIGS. 2 and 3. The operating system searches the idle list 2 associated with the interrupt level of a given piece of hardware or task being invoked. It then inserts an identifier for the specific frame manager being invoked into the idle list as is also described in detail in FIGS. 2 and 3. The operating system then searches the frame manager prioritized execution schedule 3, which resides as control data in memory, to find the proper starting point based on the task or frame manager end times. The operating system searches the frame manager priority execution schedule in control data memory to find a proper starting point for insertion of a given FCB based on the end times of the FCB to be invoked relative to the end times of any other FCBs currently in the schedule. The operating system inserts an address pointer to the frame manager FCB in the control code in memory.

Next the operating system schedule scanner 4 in FIG. 1 searches the frame manager prioritized execution schedule 3 for the next frame manager to be executed. It then accesses the frame control block for the frame manager and finds the next task in that frame manager which is ready to run. The schedule scanner 4 passes the FCB of the frame manager to the frame manager initiation control 5 which checks whether the given frame manager is resuming after interruption or is beginning a new iteration. The frame manager 6 receives initiation from the frame manager initiation block 5 and calls the next task to be executed from among any task or tasks associated with the given frame control block. The initiation control 5 gets information of where to begin or to resume an interrupted task from the fields in the FCB.

If a synchronously programmed, regularly occurring interrupt should happen during execution, the frame manager 6 will stop, branch to the interrupt handler code in block 7 associated with the level of interrupt being experienced, and wait. The interrupt handler code in block 7 will increment the appropriate clock 8 and then check its associated idle list 2 to see if any start times associated with this interrupt level for any idle FCB's have occurred. It may be noted at this point that the interrupt levels correspond to the period of task repetition or iteration required by the user's hardware for the given type of application being invoked. For example, typical rates may be 9600 iterations per second, 8000 per second, 1380 per second (the rate of processing CD player samples in blocks of 32 samples each) and so forth.

If any start times have been reached, the frame manager whose start time has been reached is removed from the idle frame manager list 2 (they still remain in the prioritized frame manager execution schedule 3) and a check is made of the priority indicator 9 to determine whether the given frame manager being removed from the idle list has greater or less priority than the currently executing task. Accordingly, the system either interrupts and saves the status of the currently executing task or allows the currently executing task to resume.

As shown in FIG. 1, there are four primary sections of control code (and five control data sections) located in the digital signal processor memory. The distinction between the two in FIG. 1 is indicated by the heavy black border surrounding control code items in memory as opposed to the lighter border surrounding control data items. The flow of data and control signals is shown by the double line with double arrows or single solid line with single arrow for bidirectional and unidirectional data flow, respectively. Control code flow is shown by the dashed lines with double arrow or single arrow for bidirectional or unidirectional control code flow among the various elements. It must be clearly understood that in order to "flow", the processor (not shown) must access the appropriate control code and execute whatever operations are dictated by it, thereby gating control data from one area to another in the processor and performing the various operations indicated in the flowcharts as will be described in greater detail later.

Detailed Description of Example Operation

To illustrate the operation of the preferred embodiment in detail, let us assume a simple, typical user application invoked at a host processor such as; "user selects hifi CD player to play back recorded music". As is generally understood, compact discs store digital data representations of audio signals together with error recovery code bits, tracking bits and other control information. A CD player must execute two tasks in order to process the digital data read from the compact disc. The first task has an execution period of 32 D to A or A to D sample times at the sampling rate of the CD player (normally 44,100 samples per second). The second task has to do the function fetching of the data samples into the digital signal processor for decompaction, error correction, etc. and must work with an execution period of 48 samples. In order to accomplish this task, the host processor builds two frame control blocks with parameters corresponding to the execution periods that are required by the user's invoked application and loads the frame control blocks into the DSP data memory. The host processor also builds two task control blocks, depending upon the tasks or subtasks to be performed in the CD player function, and loads these into the DSP's data memory. It then requests the operating system of the DSP to begin scheduling the frame control blocks to carry out these tasks.

The DSP operating system of the present invention assigns to the frame control blocks certain information not supplied by the host processor. These namely are the ALARM, ST, and ETH fields in the frame control block. These are loaded according to the current content of clocks in the associated interrupt handler data structure 7 in FIG. 1 with the content as shown in Table 2 above. The operating system then sets the FMPTR in FIG. 1 block 10 equal to the frame control block 1. That is, "FMPTR" will hold the address in memory where the frame control block 1 has been loaded. The operating system will then search the frame manager prioritized execution schedule 3 and insert the frame control block into the schedule at the appropriate place by scheduling a frame manager FM1 corresponding to the FCB1 at the appropriate spot in the schedule. This is done by the operating system executing the frame manager scheduling process generally controlled by the code in FIG. 1, block 1 and following the process given in detail in FIGS. 2 and 3.

At the outset, it may be assumed for simplicity that the current content of the clocks referred to above happen to be zero. Given this, the activities directed by the control code in FIG. 1, block 1 are described in detail in FIGS. 2 and 3.

Figure 2B:
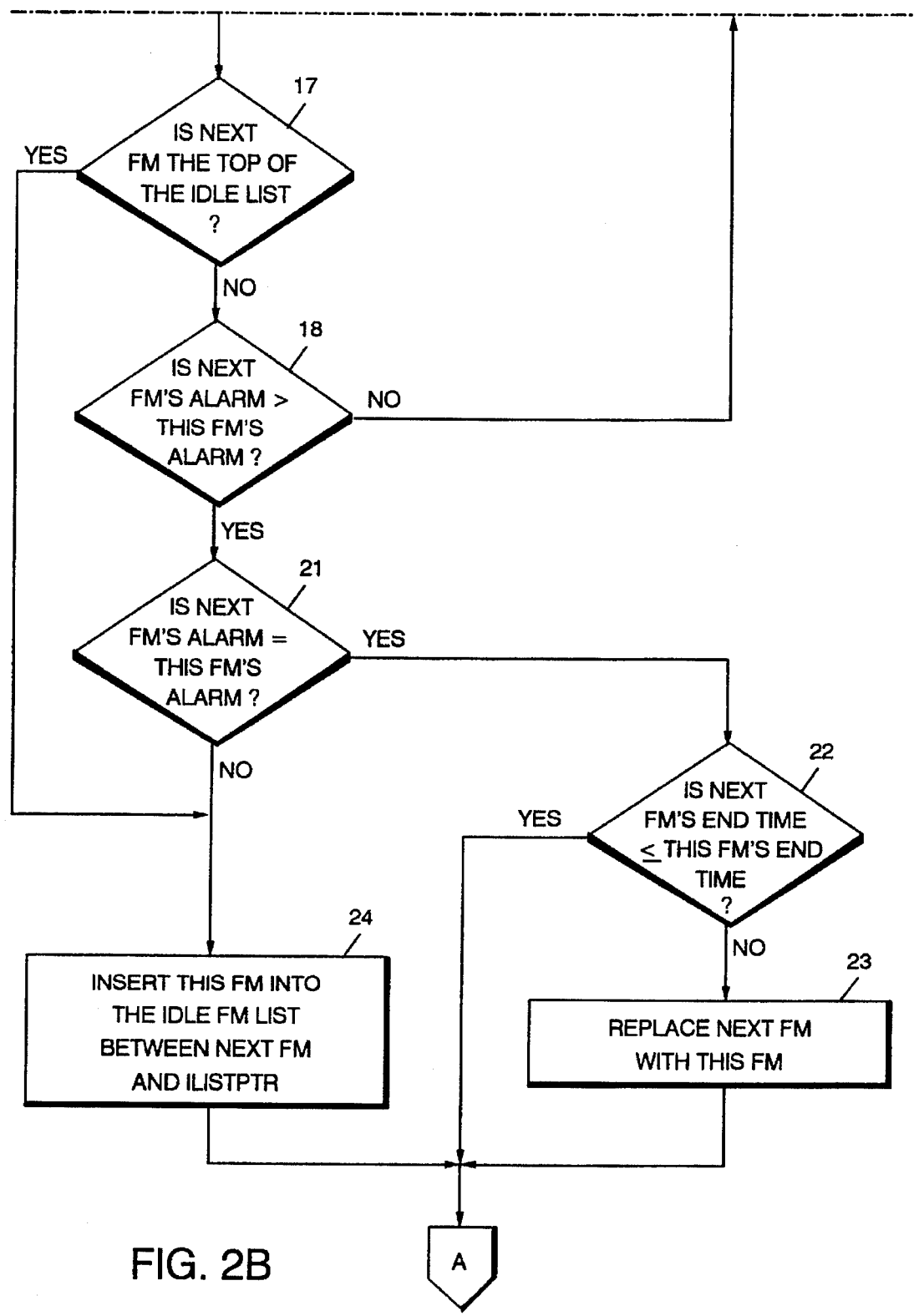
FIG. 2, consisting of FIGS. 2A and 2B, represents a flowchart of the logical process of the scheduling technique for the portion involved in addition of an invoked task to a supplemental list or queue containing invoked tasks which are currently idle.

In FIG. 2, the process begins at block 11. In block 11, the current frame manager is set equal to the frame manager pointer from the FCB. Block 12 calculates the new starting and ending times for this particular frame manager. The new starting time will be whatever the old starting time was plus the frame count from the FCB. In the present example the frame is 32 samples. The new ending time will be calculated as the old ending time plus the frame H from the FCB, which will be 64 $K_t$, where $K_t$ is a constant proportional to the sampling time of the given hardware which the user task is required to support. In this way, times measured within the signal processor may be correlated to the various sampling times and intervals and clocking rates of the external host environment CD player and the like.

In block 13, the new alarm condition is calculated as the old alarm plus the frame count which, in this case, will be 32.

Then the process in FIG. 2 proceeds to the bottom of the idle task list of FIG. 1 block 2 to search upward to find an appropriate place in the idle list to insert the frame control block indicator. Indicators on this list are ordered by alarm times with the earliest alarm time being first. Block 14 in FIG. 2 illustrates the setting of the idle list pointer to be directed to the bottom of the idle list to accomplish this. Since the idle list 2 in FIG. 1 will currently be empty in this example, the top of the list will be found and the frame control block indicator for frame manager 1 will be placed at the top of the list as the only entry therein. Prior to this, block 15 in FIG. 2 must be executed to start interrupt protection and prevent an error from occurring if any interrupt should happen during the time the idle list is being modified.

In block 16, the indicator for the next frame manager is set equal to PFIM from the instruction list pointer and block 17 is entered to determine if the next frame manager is at the top of the idle list and if not, to insert the frame manager in an appropriate position based on its alarm time utilizing the steps in blocks 18, 19 and 20. These latter blocks may be skipped if the next frame manager is already at the top of the list as shown by the output from block 17 going to the input to block 24. If the test in block 18 should show that the next frame manager's alarm is less than the current frame manager alarm, a further test must be made to determine whether the frame manager alarm is equal to the current alarm which is shown in block 21 of FIG. 2. If the answer is yes, the ending times of the frame managers are compared in block 22 and the idle list is reordered, if necessary, as shown in block 23. In the alternative, if the next frame manager found in the list is not equal to the current frame manager alarm, block 24 is entered and the frame manager is inserted into the idle frame manager list between the next frame manager and the instruction list pointer address and FIG. 2 is then exited at tab A and is directed to the entry at tab A in FIG. 3.

Figure 3A:
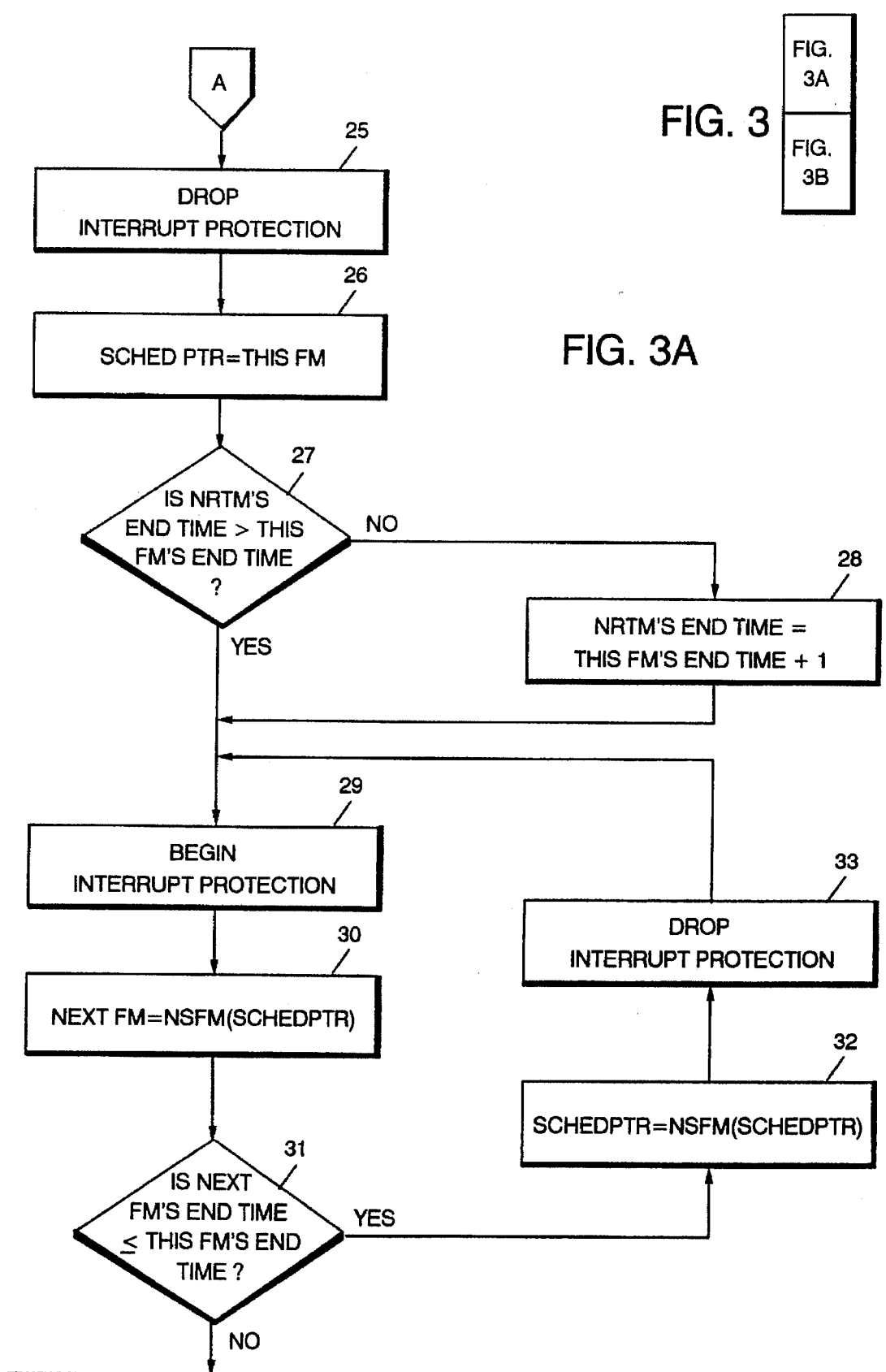
FIG. 3, consisting of FIGS. 3A and 3B illustrates the continuation of the process begun in FIG. 2, but describes the procedural steps exercised in building up the task execution priority queue.
Figure 3B:
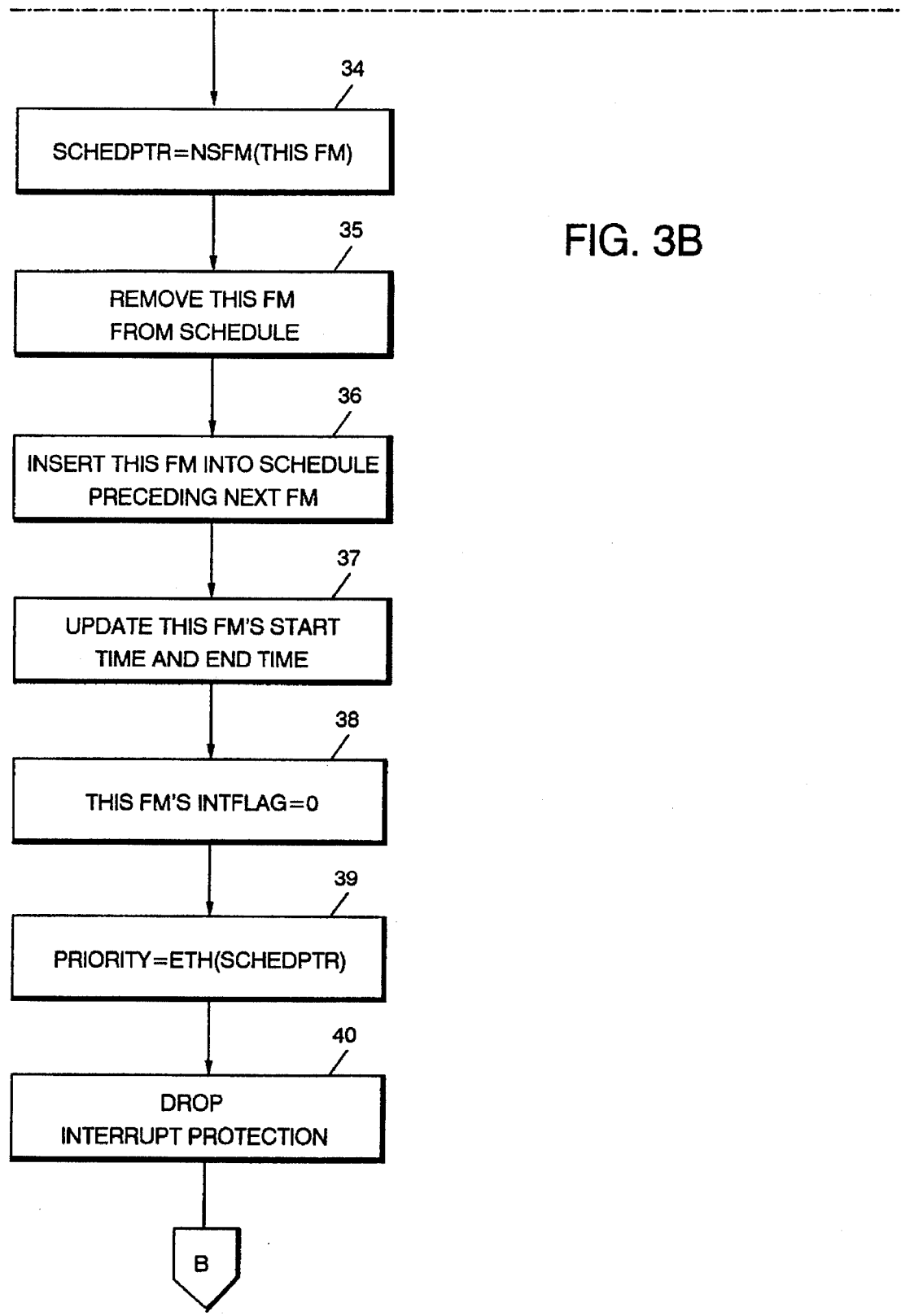

In FIG. 3 the process of reordering the prioritized frame manager execution schedule is begun by setting a non-real-time frame manager NRTM to the bottom of the list by giving it an ending time greater than the ending time of the present frame manager as indicated by the FCB1. In the example we have assumed, the NRTM's ending time will be equal to 64 Kt+1 so that the NRTM will be at least one clock count later in its end time than the only other frame manager present, namely FM1. This is shown in blocks 25 through 28 which are self-explanatory.

Next, the operating system searches the frame manager's schedule 3 in FIG. 1, beginning with steps at block 30 of FIG. 3. The search is conducted by end times, which is the mode of priority listing for the frame manager prioritized execution schedule 3. The search is conducted to find the correct spot for inserting frame manager FM1. Since in our example the frame manager schedule is presumed to be empty to begin with, FM1 will be placed as the only frame manager other than the non-real-time frame manager in the schedule or queue 3. The new start time and end time are then written into the FCB 1, the interrupt flag of the FCB 1 is set to 0 (not running) and the priority register 9 in FIG. 1 is set to the ending time of the next frame manager in the prioritized queue or schedule 3. This is shown in blocks 31–40 of FIG. 3, specifically in block 39.

The operating system control then proceeds in block 4 of FIG. 1 which is the schedule scanning process. This code searches the schedule in block 3 for any other frame manager which is ready to execute. In the present example there are no other frame managers, so the non-real-time frame manager will be found at the bottom of the list and its identification will be passed to the frame manager initiation code of FIG. 1, block 5 by the scanner in FIG. 1, block 4.

The NRTM code found from the pointers in its frame manager will be run by the processor and the priority block 9 in FIG. 1 will be set to that of the NRTM frame manager, namely 64 Kt+1 in this example. The NRTM code will insert a second frame manager into the schedule in memory in block 3 of FIG. 1, in a manner identical to the process described for the insertion of FM1 above. This will result in FM2 following FM1 in this schedule, list 3. Beginning in FIG. 1, block 1 the activities as described in FIGS. 2 and 3 will be repeated for the second frame manager.

Returning to FIG. 2, a new start time and end time for this frame manager and a new alarm time will be calculated. The start time for FM2, the second task invoked by our hypothetical user for CD playback, will have a start time of 48, an alarm time of 48 and an end time of 96 Kt. In FIG. 2, the idle list will be checked, beginning at the bottom and searched upward to find the appropriate location in the list, for inserting the indicator for FM2. Since FM2 will have an ALARM time which is later than FM1 (i.e. 48 is later than 32 sample times relatively speaking), the FM2 will be placed following FM1 in the idle frame manager list 2 of FIG. 1.

Proceeding to FIG. 3, the frame manager schedule 3 of FIG. 1 will again be searched and FM2 will be placed in the correct location in the schedule priority list or queue. Since FM2 has a later ending time than FM1, FM2 will follow FM1 in the schedule prioritized list in the queue 3. At this point, the non-real-time frame manager's ending time is set to 96 Kt+1 and the process continues to block 4 of FIG. 1 where the schedule scanning operation is conducted beginning from the frame manager's previous schedule location to search for any other frame manager to execute. Since the schedule 3 is now an ordered list of frame managers in a queue and contains FM1 followed by FM2 followed by the non-real-time manager, the non-real-time frame manager will be found by the frame manager initiation code of block 4, FIG. 1 and the non-real-time frame manager will again be executed. The priority indicator block 9 of FIG. 1 will be set to 96 Kt+1.

Since there are no additional frame managers to add to the schedule in this example, the non-real-time frame manager code will be performing various utility functions until it is interrupted by a periodically occurring interrupt source indicating that the alarm from the idle list for either FM1 or FM2 has occurred. When such an interrupt occurs, the code execution of the operating system is directed to the interrupt handler code at the given level of interrupt in block 7 of FIG. 1, and then the interrupt process shown in FIG. 5 will be run.

Figure 5:
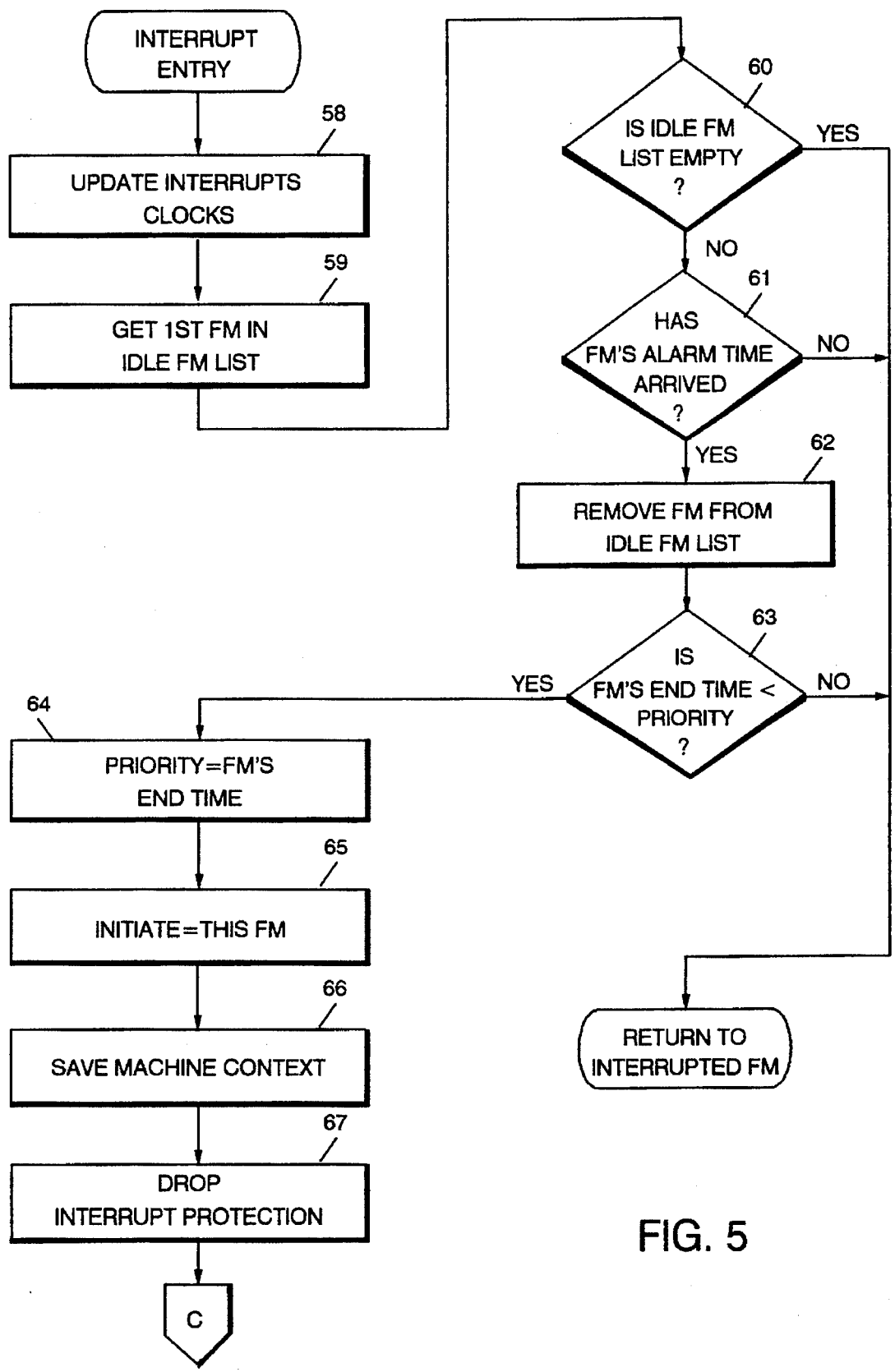
FIG. 5 illustrates the interrupt handling process in its effect on management of the idle task list and interaction with the active task execution queue.

The interrupt handler code in FIG. 5 in block 1 updates its clocks as shown in block 58. The data for updating the clocks is contained in the interrupt handler data structure of Table 2, referred to previously. The interrupt handler code checks the idle list in its associated interrupt level paired idle list 2. In the present case, the FM1 will be found. Its alarm time was equal to 32 sample times and will be checked against the current time shown by SCLOCK (block 8 of FIG. 1) which will be equal to 1. Since the current alarm of 32 will not be equal to the content of the SCLOCK, execution will resume from where it was interrupted.

Interrupts are fielded in this manner until finally the SCLOCK count, which is incremented each time, happens to equal the alarm count, i.e. it will indicate that the FM1 start time has occurred. At this time, FM1 will be removed from the idle list by making the top of the idle list point to the next frame manager in the list, in this case FM2. Then the priority, that is the ending time of FM1, is compared against the content of the priority register 9 in FIG. 1. The priority of frame manager 1 is the ending time from FCB 1 which is 64 Kt. However the content of the priority register 9 will be 96 Kt+1 from the NRTM frame manager, so FM1 will have higher priority because it occurs earlier in ending time than the frame manager of the NRTM code. This is shown in blocks 59 through 64 in FIG. 5. In block 64, the priority register 9 of FIG. 1 will be set to 64 Kt, which is the end time of FM1. The context, i.e. the current status of all operating registers, etc. in the digital signal processor, will be saved due to this interrupt in the various fields of the non-real-time managers' FCB and the process will continue to FIG. 6.

Figure 6A:
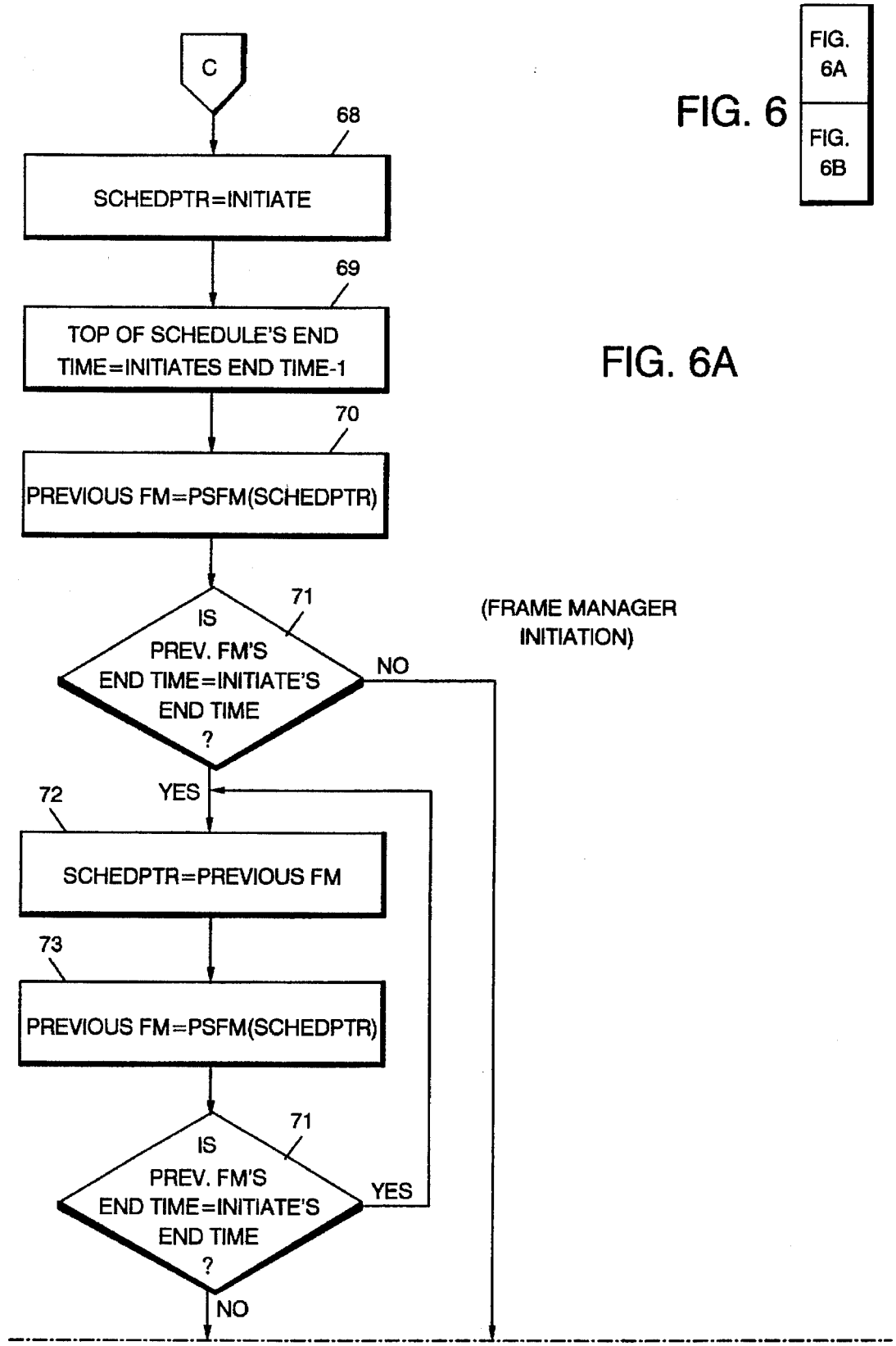
FIG. 6, consisting of FIGS. 6A and 6B, illustrates the process flow for adjusting, if required, an entry in the task execution queue, just prior to invoking that task or group of tasks, in a multiple interrupt system.
Figure 6B:
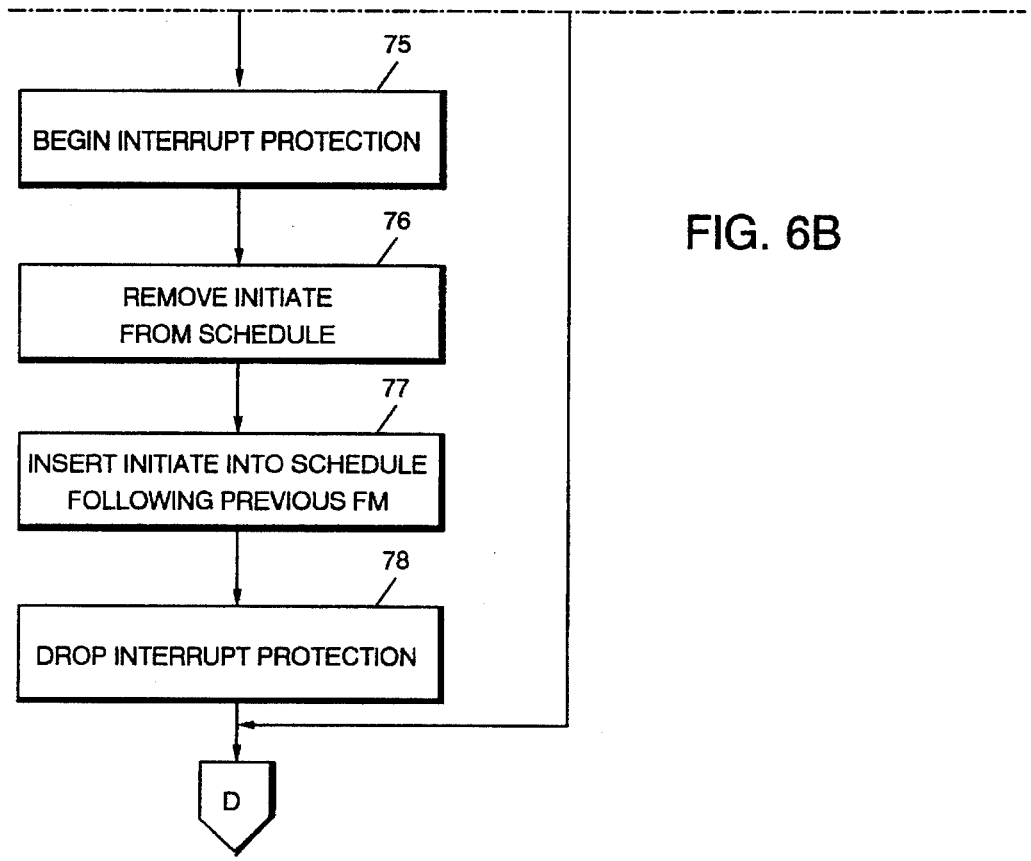

In FIG. 6, the schedule in block 3 of FIG. 1 will be checked to be sure that FM1 is not preceded in the schedule by any other frame manager with an identical ending time, i.e. "same priority". This phenomenon can only occur in a multi-interrupt system and only when the frame manager's in question have identical or nearly identical execution periods. If this were to occur, the frame manager schedule 3 would be adjusted so that the frame manager to be executed would precede all other frame managers which have identical end times. That is, of the frame managers having identical deadline or completion times, the frame manager having the earliest actual start time is taken first. In the present example no other frame managers precede FM1 so execution will continue as shown in FIG. 4, tab D which enters at block 56 in FIG. 4B. At this point the frame manager pointer of block 10 will be set to point to the FCB 1 which belongs to FM1 and FM1 is executed.

When FM1 finishes execution, it will return to the operating system for rescheduling which begins again the process shown in FIG. 2 with the calculation of new start time, end time and alarms. In the present example, the start time will be recalculated to 64, the alarm to 64 and the end time to 96 Kt. Then the idle list will be searched from the bottom up and FCB 2's frame manager will be encountered in the idle list and found to have the alarm time of 48. Consequently, FM1 will be placed following FM2 in the idle list since it now has a later starting time than FM2. The process continues on into FIG. 3 where the non-real-time frame managers end time will be found to be greater than FM1's end time so the end time for the NRTM frame manager will not be changed. The frame manager schedule 3 of FIG. 1 will now be searched by the scanner of block 4 of FIG. 1 starting with FM1's current position in the frame manager's schedule 3. Frame manager 2 will be found next and since the FM2's ending time is equal to FM1's ending time, FM2 will be passed by. Following FM2 is the non-real-time frame manager having an ending time greater than FM1's, so FM1 will be reinserted into the list between FM2 and the non-real-time manager. Thus, the frame manager schedule 3 or queue has now been reordered to contain a marker for the top of schedule, FM2, FM1 and last, the non-real-time frame manager.

Figure 4A:
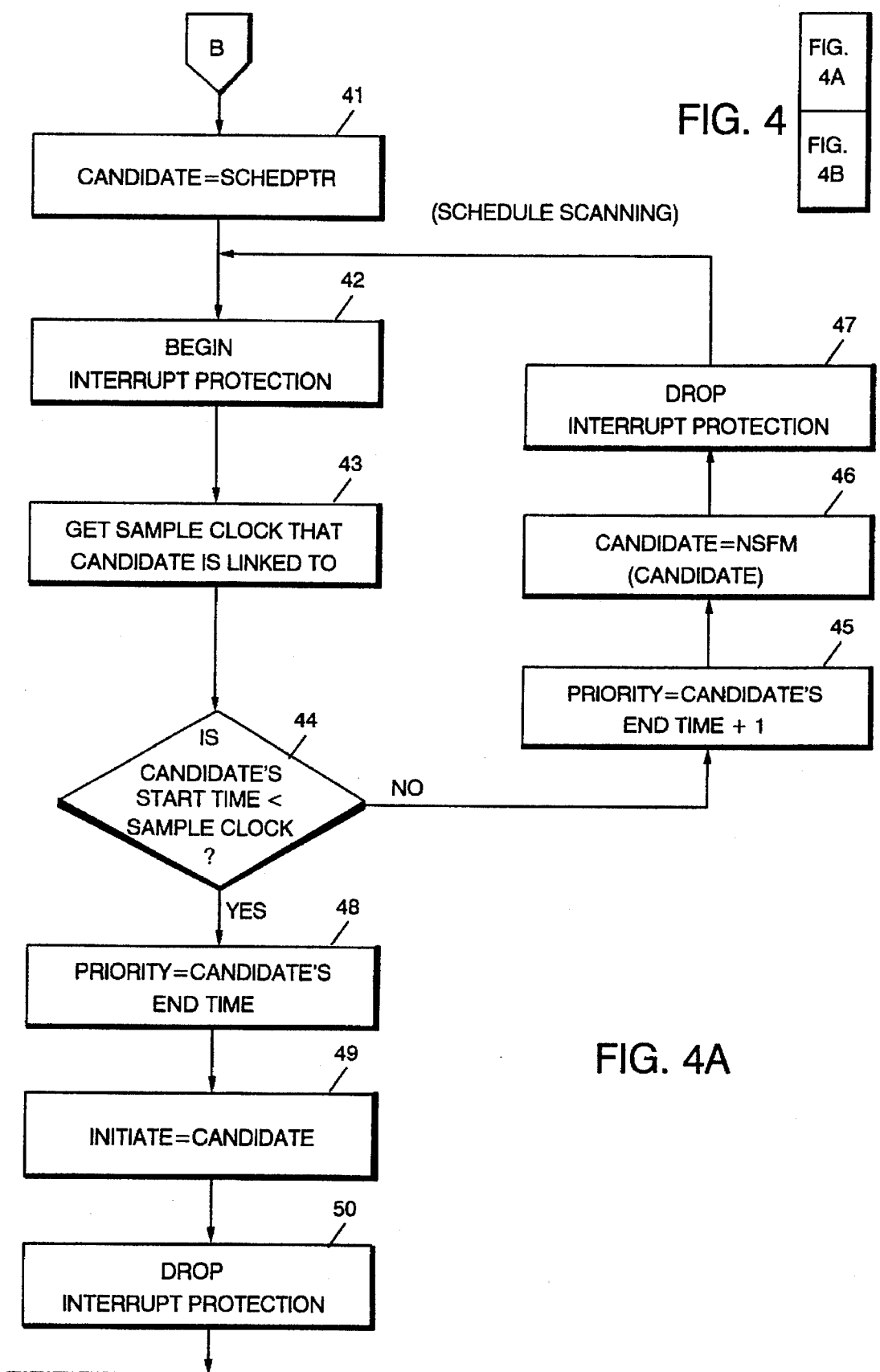
FIG. 4A illustrates the continuation from FIG. 3 of the task execution queue process in which scanning of the queue or schedule of tasks to be executed is detailed.
Figure 4B:
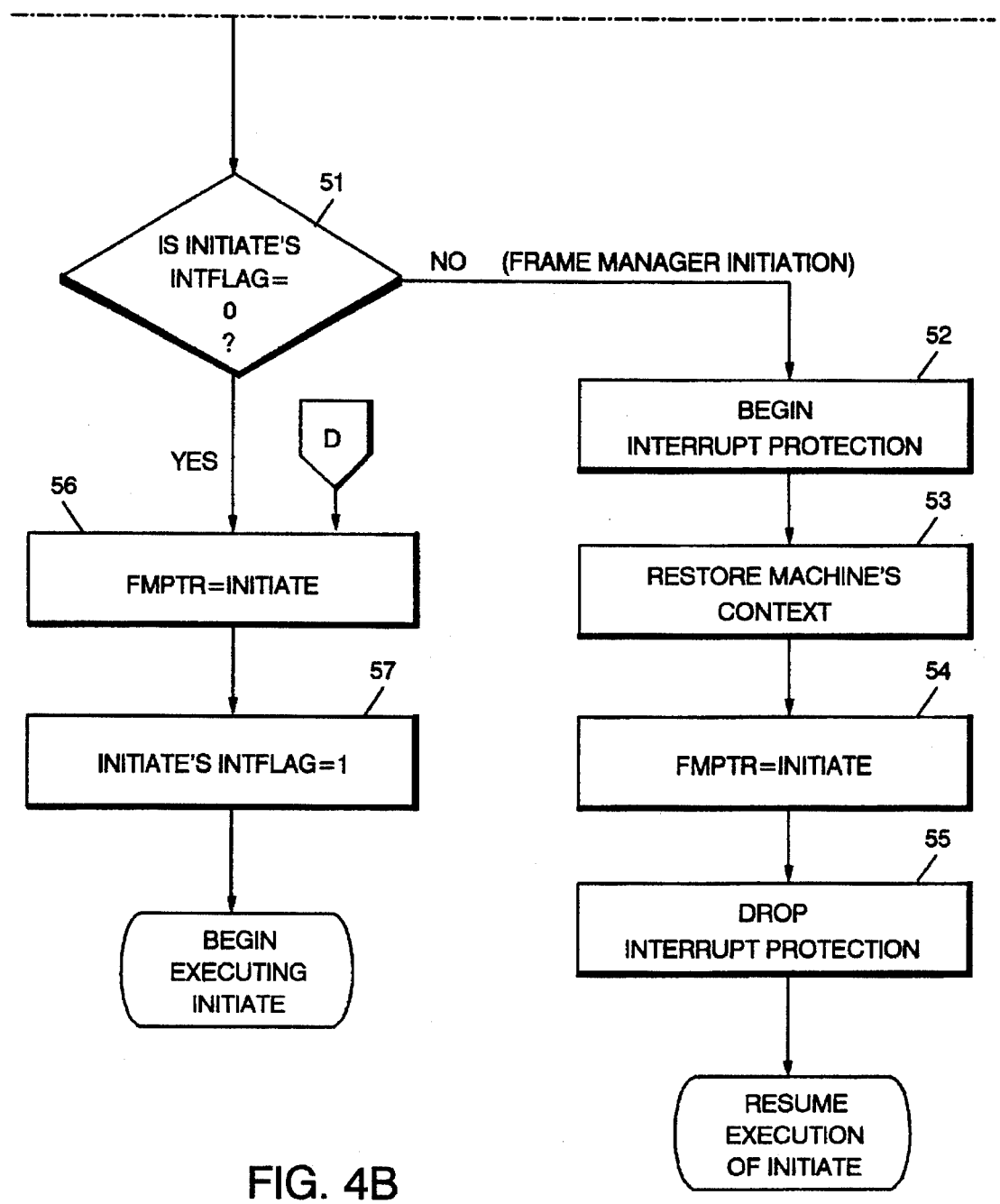
FIG. 4B illustrates the portion of the task execution queue management process in which a given task or group of tasks having equal completion deadlines may be initiated for execution.

FM1's new end time and start time are written in its FCB 1, the priority register 9 is set to the end time of the next frame manager, FM2 and so is set to 96 Kt, and the rescheduling process continues as shown in FIG. 4A, Tab B. There the frame manager schedule is scanned beginning with frame manager 1's former location in the schedule queue in order to find the next frame manager to be executed. FM2 formerly followed FM1 in the schedule 3, so the searching operation begins at FM2 which means FM2 is the next candidate to be checked.

Now we may suppose that at this particular point in time the starting time for FM2 arrives, that is, an interrupt which corresponds to the start time alarm of FM2 occurs. As previously described, the interrupt handling code of FIG. 5, which is in the interrupt handler block 7 of FIG. 1, will determine if the ALARM for FM2 has occurred and FM2 will be removed from the idle list level corresponding to the interrupt level on which this interrupt exists. This time, however, frame manager 2's ending time is not less than that contained in the priority register 9, so execution will be resumed from where it was interrupted. Execution was interrupted in FIG. 4A, tab B, so resuming from this point, FM2 is the candidate for execution and the start time for it is compared in block 44 with the SCLOCK content of its interrupt source. They will be found to be equal in this example, so the priority register block 9 of FIG. 1 is set to the ending time of FM2 and FM2 is now the frame manager to be initiated (that is executed) by the frame manager initiation code of block 5, FIG. 1 as illustrated in detail in FIG. 4B.

In FIG. 4B, first the initiation flag of FM2 is tested to see if this frame manager is in an interrupted state. The interrupt flag will be found to be 0, indicating that FM2 was not in an interrupted state, but instead, is ready to be executed from the beginning. The frame manager pointer in block 10 of FIG. 1 will be set to point to the FCB2 in memory to indicate that FM2 will now be executing. The FM2 interrupt flag will be set to 1 to indicate FM2's state will need restoring if it is subsequently interrupted or preempted by a higher priority frame manager, and frame manager 2 will be executed. This is shown in blocks 51–57 in a self-descriptive manner.

While the foregoing process may seem complex, it is easily executed and occupies only a few machine cycles. The process will continue indefinitely with FMs 1 and 2 continually being rescheduled upon completion of execution. They will continually be rearranged in the frame manager's schedule according to their current, respectively calculated next end times and will continually be placed on or removed from the idle list as they transition from the active to the idle and from idle to active state. The rescheduling process is interruptable as indicated throughout this description in that a frame manager being executed may be interrupted and preempted while being executed. If this occurs, the machine status of the digital signal processor is saved in the FCB as noted above within the specific fields allotted therein. When control is finally returned to the interrupted frame manager, rescheduling will continue normally as though no interruption occurred.

DETAILED FLOWCHART DESCRIPTION

To describe the process in FIGS. 2 and 3 in detail, reference may be had to the numbered blocks and the following description. In FIG. 2, block 11 a retrieval of the pointer to the FCB of the active frame manager is carried out to indicate that the frame manager is being rescheduled in the prioritized queue 3 of FIG. 1. In block 12, the process must calculate new start and end times according to the routine that the "new start" equals the "old start" plus "FRAME" from the FCB and the "new end" time equals the "old end" time plus "FRAMEH" from the FCB. In block 13, a new alarm must be calculated and set in the FCB to the new starting time. In block 14, the system must retrieve the pointer to the bottom of the idle frame manager list 2 of FIG. 1. This comes from the interrupt handler data structure shown in Table 2 earlier.

In block 15, any interrupts are masked to prevent any interrupt from occurring during the succeeding steps. In block 16 the pointer is retrieved which points to the FCB of the next frame manager to be checked, where the next frame manager to be checked is the previous frame manager indicated in the idle frame manager list. In block 17 the check is conducted for the top of the idle frame manager list and if the top is found, operation proceeds to block 24.

In block 18, a check is made to determine whether the alarm for the next frame manager is less than the active frame manager's alarm and, if true, the process continues to block 21. In block 19, the idle list pointer is set to the previous idle frame manager in the idle frame manager list. That is, the idle list pointer is moved up by one entry in the idle frame manager list.

In block 20, the interrupt is unmasked so that any pending interrupts may then be serviced and system then proceeds to block 15 and, if no interrupt occurs, flows through blocks 15 and 16, etc.

In block 21, a check is made to determine whether the alarm of the next frame manager is equal to the alarm of the active frame manager and, if so, the operation proceeds to block 22 but, if not, proceeds to block 24.

If in block 21, the next frame manager's alarm is found equal to the active frame manager's alarm, then only one of these two frame managers needs to stay in the idle frame manager list, and block 22 is entered. A check is made to determine if the end time of the next frame manager is less than or equal to the active frame manager's end time and, if so, the active frame manager need not be placed in the idle frame manager list and the idle frame manager list search and insertion process has been completed.

In block 23, assuming the process has not been completed in block 22, the next frame manager is replaced with the active frame manager in the idle frame manager list. That is, the next frame manager is removed from the list and the currently active frame manager is put in its place and the idle frame manager list search and insertion process has been completed.

In block 24, an insertion in the idle frame manager list of the active frame manager between next frame manager and idle list pointer is made for the condition in which this is appropriate, i.e. the active frame manager will follow the next frame manager and precede the frame manager pointed to by the idle list pointer and the idle list search and insertion process is complete.

FIG. 2 thus represents the procedural steps as a means for maintaining a queue or list of frame managers whose execution has been completed and which are awaiting a new start time in their periodically recurring task interrupt schedule. The idle frame manager list thus represents a means of alerting the operating system whenever a starting time for a currently inactive frame manager occurs. This allows the operating system to examine the execution schedule or queue to determine whether the priority of the currently ready-to-run frame manager is higher than that already executing so that the presently executing frame manager should be preempted.

FIG. 3 in detail represents the frame manager prioritized execution queue, or schedule search and insertion process, conducted by the control code in blocks 1 and 4 of FIG. 1. In FIG. 3, the process begins at block 25 which unmasks any interrupts to allow pending interrupts to be serviced. In block 26 the schedule pointer is initially set to the active frame manager to point to the frame control block of the then-active frame manager being executed. In block 27 a check is made to determine if the non-real-time manager has an end time which is later (that is greater than) the end time of the active frame manager. If so, the process continues to block 29. If not, the process continues to block 28 where the end time of the non-real-time frame manager is set equal to the active frame manager's end time plus 1. Thus, the non-real-time frame manager will have a later ending time than that of any frame manager in the present schedule, i.e. the NRTM frame manage serves as the end of the frame manager queue or schedule list which is ordered in accordance with the end times of the frame managers.

In block 29, interrupts are again masked to prevent any interruptions from occurring during the process which follows. In block 30, the next scheduled frame manager is established following the scheduled pointer. This means the current pointer in the frame manager schedule is established as the next frame manager indicator. In block 31, a check is made to determine if the next frame manager's end time is not less than or equal to the active frame manager's end time. Then the proper new location for the active frame manager will have been found and the process may continue in block 34. Otherwise, the process proceeds to block 32. In block 32, the schedule pointer is established so that the next scheduled frame manager following the current schedule pointer will be pointed to, i.e. the pointer is moved down one location in the frame manager schedule. In block 33 interrupts are unmasked to allow servicing of any pending interrupts and then the process continues to block 29.

In block 34, the schedule pointer is established as pointing to the frame manager which currently follows the active frame manager. In block 35, the active frame manager is removed from the frame manager schedule, and in block 36, the frame manager which was active is reinserted into the schedule following the "next frame manager". In block 37, a new start and end time is written into the FCB of the active frame manager, and in block 38, the interrupt flag for the active frame manager is set to zero indicating that the active frame manager is not in an interrupted (i.e. running but halted) state. In block 39, the system priority is established for block 9 of FIG. 1 as the end time of the frame manager pointed to by the current schedule pointer. This will be the frame manager which formerly followed the active frame manager in the frame manager schedule queue 3. In block 40, interrupts are unmasked to allow servicing of any pending interrupts and the frame manager search and insertion process has been completed.

It may be seen from the foregoing that FIG. 3 illustrates a process in which the prioritized queue of frame managers corresponding to user tasks to be executed is established and managed in accordance with the earliest frame manager deadline or end time. Any user tasks having the same frequency of recurrence and same required result available deadline must be handled by this frame manager during its execution period. The list or queue of frame managers in their prioritized order is sorted and rescheduled as shown whenever a frame manager end time is reached or a new frame manager is inserted by execution of the non-real-time frame manager code or deleted by such code.

FIG. 4A shows the frame manager schedule scanning process conducted by block 4 of FIG. 1. In block 41, the frame manager pointed to by the schedule pointer is established as the candidate for execution. Block 42 masks interrupts during the process which follows. Block 43 gets the content from the sample clock, SCLOCK, from the associated interrupt data structure in block 7 for the interrupt source to which the candidate frame manager is linked, i.e. the timer for the interrupt level on which the FCB and frame manager are controlled. In block 44, if a candidate frame manager start time has arrived (or has even been passed) then the start time will be less than or equal to the SCLOCK and the present frame manager can be executed. The process then continues in block 48. If the candidate frame manager start time has not yet occurred, it cannot be executed and must be bypassed. The process will thus continue to block 45. Note that the non-real-time manager frame manager is initialized in such a manner that its start time will always appear to have occurred so that the non-real-time frame manager can always be executed whenever it is reached in the list.

In block 45, the priority is established for block 9 in FIG. 1 as equal to the candidate frame manager's end time plus 1. In block 46, a new candidate is established as the frame manager which follows the current candidate in the frame manager's schedule In block 47, interrupts are unmasked to allow servicing of any pending interrupts and then the operation continues to block 42.

In block 48, the system establishes the priority for block 9, FIG. 9 as the end time of the candidate frame manager. In block 49, the system establishes the candidate frame manage as the frame manager which is to be initiated (i.e. executed). In block 50, the system unmasks interrupts to allow servicing of any pending interrupts and the schedule scanning process has been completed and the next frame manager to be executed will have been found.

The process in FIG. 4B shows how a frame manager initiation, i.e. execution, is begun. In block 51, if the initiate frame manager has an interrupt flag equal to zero, it has not been in an interrupted state and should be executed from its beginning, so the process proceeds to block 56. However, if the interrupt flag is set equal to one, the frame manager has been previously interrupted and execution should be resumed from the status where it was at the time it was interrupted. This means that saved contents must be reestablished and the process proceeds to block 52 where interrupts are masked. In block 53, the machine's content at the time an interrupt occurred is restored from the save context area of the frame manager's FCB, referred to previously. In block 54, the frame manager pointer is established to point to the initiated frame manager and the initiated frame manager becomes the active frame manager for execution. In block 55, interrupts are unmasked and the entire rescheduling process has been completed so that execution of the interrupted frame manager may be resumed.

In block 56, which is entered from block 51 or from FIG. 6, block 77, the frame manager to be initiated is to be initiated from its beginning. Therefore, the frame manager pointer is established to be equal to the initiate's and the initiate candidate becomes the active frame manager. In block 57, the initiate frame manager's interrupt is set equal to one to indicate that, if the initiate is subsequently interrupted and preempted by any other frame manager, its content will need to be saved for restoration and execution must be resumed from the point of interruption. This completes the entire rescheduling process and the execution of a new active frame manager has begun.

The interrupt handling code of block 7 is detailed in FIG. 5. In block 58, the clocks are updated in the interrupt handler data structure as shown in Table 2. In block 59, the first frame manager in the interrupt handler's idle frame manager list associated with this interrupt level is accessed. If the idle list 2 is empty, as shown in block 60, it means that there are no frame managers presently residing on this interrupt level and the system returns to the interrupted process. In block 61, if the frame manager idle list does have a frame manager and the top of that list has arrived, i.e. a start time has occurred, the process proceeds to block 62, otherwise it returns to the interrupted process. In block 62, the first frame manager is removed from the idle frame manager list since it has now become active or its start time has passed. In block 63, if the frame manager's end time is less than that indicated presently in priority block 9 of FIG. 1, it currently has a higher priority than the active frame manager and it must be executed, so the process proceeds to block 64. Otherwise, the process returns to the process that was interrupted. In block 64, priority is reestablished as the current frame manager's end time to indicate that the interrupting frame manager has priority. In block 65, the frame manager that is interrupting is established as the frame manager to be initiated, i.e. executed. In block 66, the machine's current context is saved in the save context area of the frame manager which is being preempted. In block 67, the interrupt protection is dropped to permit any subsequent interrupts to be serviced. This completes the interrupt process and the flow continues in the operating system to the multi-interrupt schedule adjustment shown in FIG. 6 beginning at block 68.

In FIG. 6, in a multi-interrupt level system such as that schematically depicted in FIG. 1, it is necessary to establish the schedule pointer to be the initiated frame manager's, i.e. it must point to the frame manager to be executed. In block 69, the top of the frame manager schedule, which is a dummy FCB serving as the starting point of the frame manager schedule, has to have an end time which is not equal to the initiated frame manager's end time, thus preventing searching up past the top of the frame manager's schedule in the queue. In block 70, the frame manager which precedes the current schedule pointer is established as the "previous frame manager". In block 71, if the end time or the previous frame manager is not equal to the end time of the initiated frame manager, then no schedule adjustment is required and the process may proceed to execute the initiated frame manager by continuing to FIG. 4B, block 56. Otherwise, the process proceeds to block 72.

In block 72, the system establishes the previous frame manager as the schedule pointer and moves the frame manager up by one space in the frame manager schedule. In block 72, the process of block 70 is repeated. In block 73, if the ending time of the "previous frame manager" is equal to the ending time of the initiated frame manager, then the scanning has not yet found the preceding frame manager with an ending time different from the initiate, so the process must proceed to block 72. Otherwise, the process proceeds to block 75. In block 75, interrupts are masked and in block 76 the initiated frame manager is removed from the frame manager's schedule only to be reinserted into the frame manager schedule at a point following the previous frame manager. In block 78, interrupts are unmasked to allow any interrupts pending to be serviced. Adjustment of the frame manager schedule so that the initiated frame manager precedes all frame managers having end times identical to the initiate's end time has been completed and the process may continue to FIG. 4B, block 56.

Figure 7:
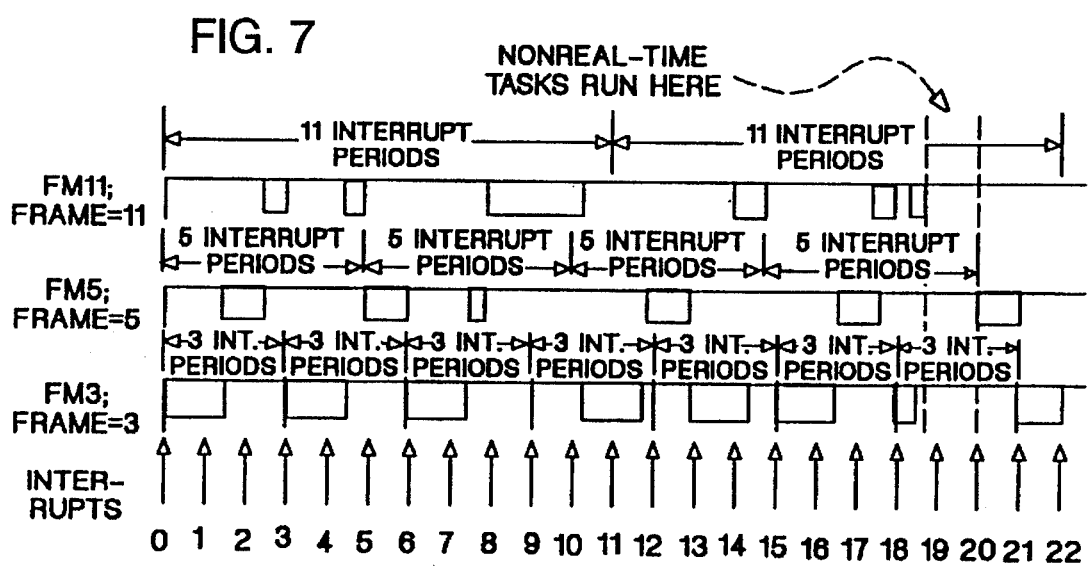
FIG. 7 illustrates in a schematic form the scheduling of recurrent tasks based on their execution result required deadlines in accordance with the preferred embodiment of the invention.

The overall operation of the operating system in the scheduling and rescheduling, interrupting or reestablishing of execution of frame managers is graphically illustrated in FIG. 7. In FIG. 7, three exemplary frame managers denoted FM11, FM5 and FM3 are illustrated in a time line based on a count of interrupts. The frame managers 11, 5 and 3 have execution frames of 11, 5 and 3 interrupt times, respectively. That is, the frame managers will have starting and ending times which occur regularly at every 11, 5 or 3 interrupt times. The frame managers might all be linked to the same hardware interrupt source as shown in this example for simplicity. The boxes along the time lines associated with the frame manager 11, 5 and 3 indicate the time periods in which the frame manager actually do execute. Arbitrarily labelling the various interrupts as 0, 1, 2, etc. and starting from 0, the process then proceeds as follows:

Frame managers 11, 5 and 3 all have starting times beginning at interrupt 0. The order of the execution schedule, based on ending times will thus be frame manager 3, followed by 5 followed by 11. Frame manager 3, being the first frame manager in the execution schedule, will begin execution at interrupt 0. Execution of frame manager 3's task is shown to complete sometime after interrupt 1 and will thus be rescheduled to begin again at interrupt 3 with a new ending time at interrupt 6. The new order of execution of the schedule is now frame manager 5, followed by 3 followed by 11. Frame manager 5 will begin execution next because it has already reached a start time and it is now first in the execution schedule, frame manager 3 having been executed. Frame manager 5 will complete execution sometime after interrupt 2 has been reached and will be rescheduled to a new start time beginning at interrupt 5 with a new ending time at interrupt 10. The new order of the execution schedule will now be frame manager 3 followed by 5 followed by 11. However, at this point in time, i.e. just after interrupt 2, frame managers 3 and 5 proceed frame manager 11 in the execution schedule, but their starting times have not yet occurred. Frame managers 3 and 5 are thus bypassed and frame manager 11 actually begins execution.

At interrupt 3, the start time for the second iteration of frame manager 3 occurs but frame manager 11 has not completed its execution. Frame manager 3 precedes frame manager 11 in the execution schedule and thus has a higher priority. Thus, frame manager 11 is preempted, i.e. interrupted (its current state of processing is saved in its FCB) and frame manager 3 begins the second iteration of its execution. When frame manager 3 completes execution, it is rescheduled with a new starting time at the interrupt point 6 and a new ending time at interrupt 9.

The new order of execution for the schedule is now FM3, FM5 and FM11. At this point in time, frame managers three and five precede frame manager eleven, but their start times have not yet start time for frame manager three will occur at interrupt nine, but frame manager three will not begin execution because its priority is less than that of frame manager eleven in the new execution schedule. The start time for frame manager five will occur at interrupt ten, but frame manager five will not begin execution because frame manager eleven has higher priority than frame manager five in the new schedule. Frame manager eleven will thus complete execution and be rescheduled to have a new start time at interrupt eleven and a new end time at interrupt twenty-two. The new order of execution priority in the schedule will thus be frame manager three, frame manager five, and frame manager eleven. The starting time for frame manager three has already occurred, so frame manager three begins execution at once. The start time for frame manager eleven will occur at interrupt eleven, but frame manager eleven does not begin execution because frame manager three has higher priority in the new execution schedule than that held by frame manager 11. Frame manager three will complete execution sometime after interrupt eleven and be rescheduled at a new starting time at interrupt twelve and a new ending time at interrupt fifteen.

The new order of execution priority in the execution schedule or queue will be frame manager five, frame manager three, followed by frame manager eleven. Frame manager five will begin execution because its start time has already occurred and because it precedes frame managers three and eleven in the execution priority queue. The start time for frame manager three will occur at interrupt twelve, but as frame manager three does not have higher priority than frame manager five, frame manager three will not begin execution. Frame manager five will thus complete execution sometime after interrupt twelve and will be rescheduled occurred or reoccurred and thus are bypassed while FM11 begins (resumes from interruption) execution.

At interrupt #5 the start time for frame manager five occurs for its second iteration but frame manager eleven has not yet completed its execution. Frame manager five precedes frame manager eleven and thus has a higher priority (in the execution schedule queue) so frame manager 11 is again preempted (interrupted) and frame manager five begins its second iteration of execution. At interrupt #6, the start time for frame manager three recurs, but frame manager five has not completed its execution and so is interrupted.

Frame manager three precedes frame manager five, so frame manager five is preempted, i.e. interrupted, and frame manager three begins its third iteration of execution. Frame manager three will complete sometime after interrupt seven is reached and will be rescheduled to have a new start time at interrupt nine and a new end time at interrupt twelve.

The new order of execution will now be frame manager five, frame manager eleven and frame manager three. As frame manager five is first in the schedule, its execution will be resumed from where it was interrupted and will run until completion and will be rescheduled so that it has new start time at interrupt ten and new end time at interrupt fifteen.

The new order of execution for the schedule or priority queue of frame managers is now frame manager eleven, frame manager three, and frame manager five. The execution of frame manager eleven, now interrupted several times, is resumed. The to have a new starting time at interrupt fifteen and a new end time at interrupt twenty. The new order of execution for the priority queue is frame manager three followed by frame manager five and frame manager eleven. Frame manager three will begin its fourth execution because its start time has occurred and it has higher priority than Frame Managers five and eleven.

The foregoing process will continue throughout many iterations until interrupt eighteen, when frame manager eleven will complete execution again. At this time frame managers three, five, and eleven have all completed execution for their current frame and their start times have not re-occurred; and when this condition prevails, the non-real time frame manager task may be permitted to execute. Eventually an interrupt twenty occurs and the start time of frame manager five will be reached and the non-real time task frame manager will be interrupted and execution of the frame manager five will resume as described above.

From the foregoing it may be readily understood that a new operating system and method of operation have been defined which are ideally suited to the randomly occurring mix of selected hard, real-time dependent tasks such as those encountered in multi-media, robotic and other similar complex interactive user system environments. No specific dependence upon a particular processor, such as the digital signal processor utilized to illustrate the preferred embodiment, is implied since the operating system and method are perfectly capable of adaptation or installation on any general purpose computer system. An operating system, including task execution, prioritization and scheduling on the basis of re-occurring task completion or end times has been described in detail with respect to the preferred embodiment, but it will be readily apparent to those skilled in the art that numerous changes in the specific procedural flows may be made without departing from the function and content thereof. Wherefore, what is described in the claims and desired to be protected by letters patent is set forth by way of description only and not by way of limitation.

What is claimed is:

1. A method of controlling execution in a single processor of a varying set of one or more recurring hard, real-time completion deadline critical computer tasks in a multi-tasking computer system, each of said tasks recurring at a periodic interval, said method comprising steps of:

said computer system receiving requests for initiation of one or more of said tasks; automatically generating an ordered task execution priority queue in accordance with the required completion deadlines of said tasks, said queue having an entry therein corresponding to each of said tasks, said entries being ranked in priority corresponding to the completion deadlines of said tasks with said task having the earliest said completion deadline having the highest priority;

executing said tasks beginning with the highest priority said entry in said queue which is found ready to begin execution;

removing said highest priority entry from said queue upon completion of execution thereof;

calculating a new completion deadline for said removed entry based on the completion deadline of said removed entry plus the removed entry's periodic interval between completion deadlines; and reinserting said removed entry at a position in said queue corresponding to said new completion deadline of said recurring task, without rescheduling any other of said tasks corresponding to said entries in said queue.

2. A method as claimed in claim 1, further compromising a step of:

ordering said entries having equal completion deadlines in accordance with the starting tames of said tasks corresponding to said entries with the earliest said starting time being the highest priority entry among said entries having equal completion deadlines.

3. The method as claimed in claim 1, further comprising the step of:

inserting an entry for an asynchronous, non-real time recurring task into said execution queue at a lowest priority position.

4. The method as claimed in claim 2, further comprising the step of:

inserting an entry for an asynchronous, non-real time recurring task into said execution queue at a lowest priority position.

5. The method of controlling execution in a computer as claimed in any one of claims 1, 2, 3, or 4, further comprising the generating of an idle queue of entries, said entries corresponding to completed said execution tasks, which tasks are idle awaiting their next recurring execution start times, said idle queue ordered in priority with the highest priority assigned to the earliest said start time.

6. An operating system for controlling execution in a single processor of a varying set of periodically recurring, hard real-time completion deadline tasks in a multi-tasking computer system, wherein each of said tasks recurs at a periodic interval and is represented by a prioritized entry in an ordered execution queue, comprising:

means for automatically generating the ordered task execution priority queue in accordance with the required task execution completion deadlines of all of said tasks, with a highest priority entry in said queue corresponding to the earliest said task execution completion deadline;

means for searching said queue to find the highest priority said entry having a task which is found ready to begin execution;

means for causing the commencement of execution of any said tasks found ready to begin execution;

means for removing said highest priority entry from said queue upon completion of execution thereof;

means for calculating a new completion deadline for said removed entry based on the completion deadline of said removed entry plus the removed entry's periodic interval between completion deadlines; and means for reinserting said removed entry at a position in said queue corresponding to said new completion deadline of said recurring task, without rescheduling any other of said tasks corresponding to said entries in said queue.

7. A system as claimed in claim 6, further comprising:

means for ordering said entries having equal completion deadlines in accordance with the starting times of said tasks corresponding to said entries with the earliest said starting time being the highest priority entry among said entries having equal completion deadlines.

8. The system as claimed in claim 6, further comprising:

means for inserting an entry for an asynchronous, non-real time recurring task into said execution queue at a lowest priority position.

9. The system as claimed in claim 7, further comprising:

means for inserting an entry for an asynchronous, non-real time recurring task into said execution queue at a lowest priority position.

10. The system for controlling execution in a computer as claimed in any one of claims 6, 7, 8, or 9, further comprising:

means for generating an idle queue of entries, said entries corresponding to completed said execution tasks, which tasks are idle awaiting their next recurring execution start times, said idle queue ordered in priority with the highest priority assigned to the earliest said start time.

* * * * *